(12) United States Patent
Hokai et al.

(10) Patent No.: US 11,231,285 B2
(45) Date of Patent: Jan. 25, 2022

(54) MAP INFORMATION SYSTEM

(71) Applicant: TOYOTA JIDOSHA KABUSHIKI KAISHA, Toyota (JP)

(72) Inventors: Keisuke Hokai, Susono (JP); Yusuke Hayashi, Susono (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 16/531,205

(22) Filed: Aug. 5, 2019

(65) Prior Publication Data

US 2020/0109953 A1 Apr. 9, 2020

(30) Foreign Application Priority Data

Oct. 4, 2018 (JP) .............................. JP2018-189449

(51) Int. Cl.
*G01C 21/32* (2006.01)
*G06F 16/29* (2019.01)
*B60W 30/095* (2012.01)
*G06K 9/00* (2006.01)

(52) U.S. Cl.
CPC ......... *G01C 21/32* (2013.01); *B60W 30/0956* (2013.01); *G06F 16/29* (2019.01); *G06K 9/00798* (2013.01); *G06K 9/00825* (2013.01)

(58) Field of Classification Search
CPC .......... G06K 9/00798; B60W 2552/53; G05D 1/0274; G01C 21/3841; G01C 21/3804; G01C 21/005; G01C 21/30
See application file for complete search history.

(56) References Cited

U.S. PATENT DOCUMENTS

| 2011/0066343 | A1  |   | 3/2011 | Ota et al. |
|---|---|---|---|---|
| 2018/0107884 | A1 | * | 4/2018 | Kinoshita .......... G06K 9/00798 |
| 2018/0188037 | A1 | * | 7/2018 | Wheeler ................. H04L 67/12 |
| 2018/0189578 | A1 | * | 7/2018 | Yang .................... G06K 9/4638 |
| 2020/0249032 | A1 | * | 8/2020 | Lee ..................... G01C 21/3811 |

FOREIGN PATENT DOCUMENTS

| JP | 2011-063131 A | 3/2011 |
|---|---|---|
| JP | 2013-109625 A | 6/2013 |

* cited by examiner

*Primary Examiner* — Kenneth J Malkowski
(74) *Attorney, Agent, or Firm* — Sughrue Mion, PLLC

(57) ABSTRACT

A map information system includes a database management device configured to manage a map database used for vehicle driving support control. The map database includes road marking map information that indicates a position of a specific road marking including at least one of a stop line and a pedestrian crossing. The database management device is further configured to: detect a road marking candidate being a candidate for the specific road marking around a vehicle; recognize vehicle behavior of at least one of the vehicle and another vehicle in a period when passing the road marking candidate; determine, based on the vehicle behavior, an evaluation value that indicates certainty of the road marking candidate being the specific road marking; and register the road marking candidate having the evaluation value equal to or higher than a threshold, as the specific road marking, in the road marking map information.

7 Claims, 25 Drawing Sheets

<ROAD MARKING MAP INFORMATION RM_MAP REGARDING STOP LINE>

| POSITION | EVALUATION VALUE | |
|---|---|---|
| [X1,Y1]<br>[X2,Y2] | STOP LINE<br>EVALUATION VALUE<br>Psl | MANDATORY STOP LINE<br>EVALUATION VALUE<br>Pmsl |

<ROAD MARKING MAP INFORMATION RM_MAP REGARDING PEDESTRIAN CROSSING>

| POSITION [X1,Y1], [X2,Y2] [X3,Y3], [X4,Y4] | ARRANGEMENT DIRECTION A | PEDESTRIAN CROSSING EVALUATION VALUE Ppc |
|---|---|---|
| | | |

MAP INFORMATION SYSTEM

BACKGROUND

Technical Field

The present disclosure relates to a technique that manages map information used for driving support control that supports driving of a vehicle.

Background Art

Patent Literature 1 discloses a vehicle control device installed on a vehicle. The vehicle control device images a road surface ahead of the vehicle by using a camera. The vehicle control device analyzes the road surface image to detect a stop line on the road surface. Moreover, the vehicle control device calculates reliability of the detected stop line being actually present, based on brightness distribution of a plurality of points included in the road surface image. When the reliability is equal to or higher than a predetermined value, the vehicle control device executes vehicle travel control required for stopping the vehicle before the detected stop line.

Patent Literature 2 discloses a traffic information providing system. The traffic information providing system includes an in-vehicle device having a navigation function and a traffic information center that provides a vehicle with traffic information (traffic jam information). The in-vehicle device determines whether or not there is a deviation between actual travel information of the vehicle and the traffic information provided from the traffic information center. When there is the deviation, the in-vehicle device sends deviation information to the traffic information center. The traffic information center updates the traffic information based on the deviation information.

LIST OF RELATED ART

Patent Literature 1: Japanese Unexamined Patent Application Publication No. 2011-063131
Patent Literature 2: Japanese Unexamined Patent Application Publication No. 2013-109625

SUMMARY

Let us consider driving support control that supports driving of a vehicle. It is conceivable in the driving support control to use map information that indicates a position of a specific road marking such as a stop line and a pedestrian crossing. In order to increase accuracy of the driving support control, it is necessary to increase accuracy of the map information. In order to obtain more accurate map information, it is desirable to more accurately determine presence of the specific road marking.

According to the technique disclosed in the above-mentioned Patent Literature 1, the reliability of the stop line being actually present is calculated based on the brightness distribution of a plurality of points included in the road surface image. However, accuracy of the reliability calculation based on the brightness distribution is insufficient. For example, a white line defining a lane is erroneously detected as a stop line, and furthermore its reliability is erroneously determined to be high.

An object of the present disclosure is to provide a technique that can increase accuracy of road marking map information that is used for driving support control and indicates a position of a specific road marking.

In an aspect of the present disclosure, a map information system is provided.

The map information system includes a database management device.

The database management device manages a map database used for driving support control that supports driving of a vehicle.

The map database includes road marking map information that indicates a position of a specific road marking including at least one of a stop line and a pedestrian crossing.

Driving environment information indicates driving environment for the vehicle that is acquired by a sensor installed on the vehicle.

The database management device is further configured to:

detect a road marking candidate being a candidate for the specific road marking around the vehicle, based on the driving environment information;

recognize vehicle behavior of at least one of the vehicle and another vehicle in a period when passing the road marking candidate, based on the driving environment information;

determine, based on the vehicle behavior, an evaluation value that indicates certainty of the road marking candidate being the specific road marking; and register the road marking candidate having the evaluation value equal to or higher than a threshold, as the specific road marking, in the road marking map information.

According to the present disclosure, the database management device detects the road marking candidate around the vehicle, and determines the evaluation value that indicates certainty of the detected road marking candidate being the specific road marking. More specifically, the database management device recognizes the vehicle behavior of at least one of the vehicle and another vehicle in a period when passing the road marking candidate, based on the driving environment information. The vehicle behavior with respect to the specific road marking is totally different from the vehicle behavior with respect to other road markings (for example, a lane marking). Therefore, using the vehicle behavior makes it possible to determine the evaluation value regarding the specific road marking with high accuracy. The evaluation value being determined with high accuracy causes increase in accuracy (quality) of the road marking map information that is automatically generated based on the evaluation value. Since the accuracy of the road marking map information is increased, accuracy of the driving support control using the road marking map information also is increased.

EMBODIMENTS

Embodiments of the present disclosure will be described below with reference to the attached drawings.

1. Outline 1-1. Map Information System

Figure 1:
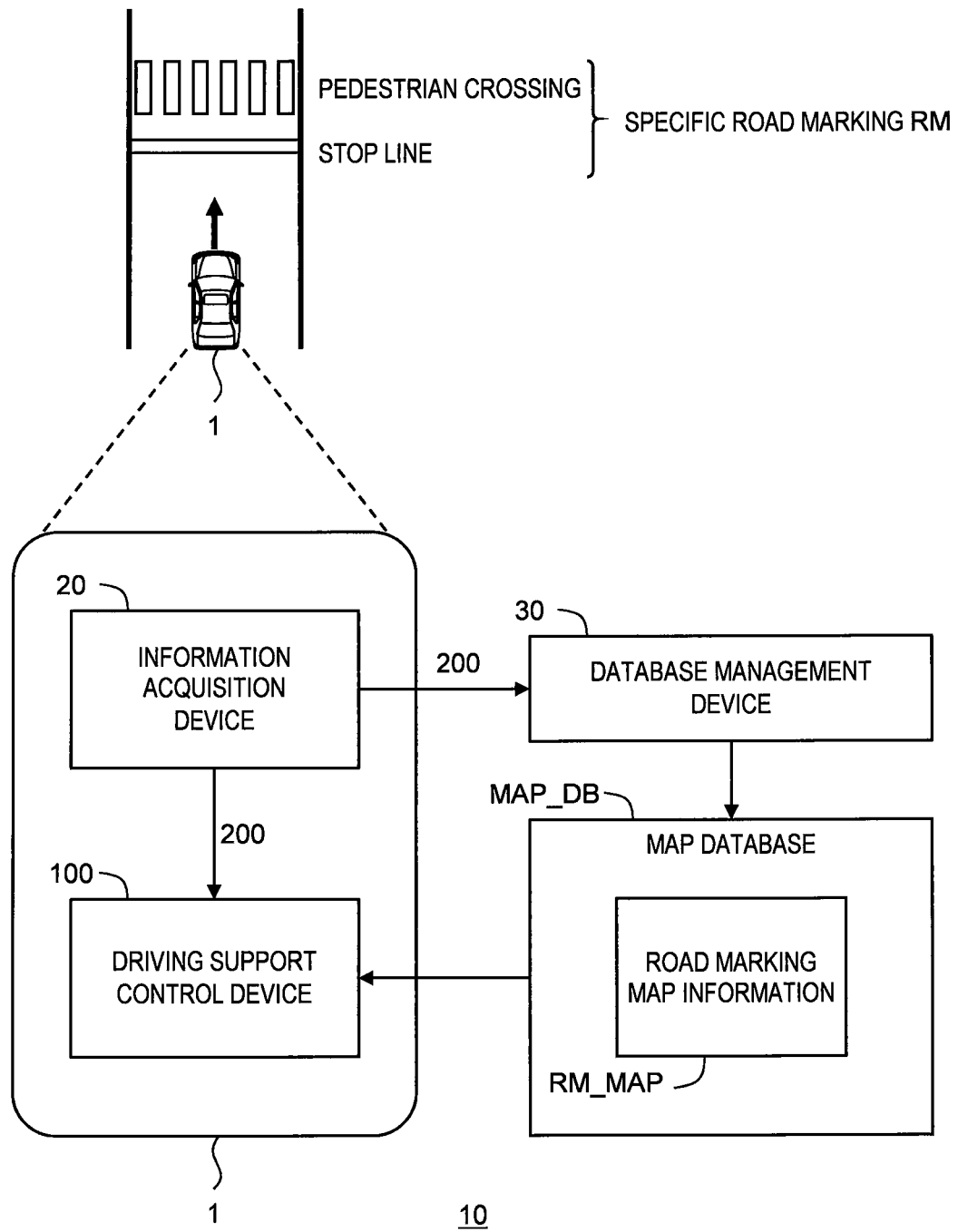
FIG. 1 is a conceptual diagram for explaining an outline of an embodiment of the present disclosure.

FIG. 1 is a conceptual diagram for explaining an outline of the present embodiment. A driving support control device 100 is installed on a vehicle 1. The driving support control device 100 executes driving support control that supports driving of the vehicle 1. Typically, the driving support control includes at least one of steering control, acceleration control, and deceleration control. Such the driving support control is exemplified by automated driving control (autonomous driving control), trajectory-following control (path-following control), lane keep assist control (lane tracing assist control), collision avoidance control, and so forth.

In the driving support control, map information is often used. The map information provides a variety of information associated with a position. Here, the position is an absolute position and is defined in an absolute coordinate system (e.g. latitude, longitude, and altitude). A map database MAP_DB is a set of a variety of map information. It should be noted that the map database MAP_DB may be stored in a memory device of the vehicle 1, or may be stored in an external device outside the vehicle 1.

A map information system 10 according to the present embodiment is a system that manages and utilizes the map database MAP_DB. More specifically, the map information system 10 includes the map database MAP_DB, an information acquisition device 20, and a database management device 30. The map information system 10 may further include the driving support control device 100 that utilizes the map database MAP_DB.

The information acquisition device 20 is installed on the vehicle 1. The information acquisition device 20 uses a sensor installed on the vehicle 1 to acquire a variety of information. Information acquired by the sensor installed on the vehicle 1 indicates driving environment for the vehicle, and such the information is hereinafter referred to as "driving environment information 200". For example, the driving environment information 200 includes vehicle position information indicating a position of the vehicle 1, vehicle state information indicating a state of the vehicle 1, surrounding situation information indicating a situation around the vehicle 1, and so forth. The driving environment information 200 is used for the driving support control by the driving support control device 100 along with the map database MAP_DB. Furthermore, the driving environment information 200 is also used for management of the map database MAP_DB.

The database management device 30 manages the map database MAP_DB used for the driving support control. The management of the map database MAP_DB includes at least one of generation and update of the map database MAP_DB.

It should be noted that the database management device 30 may be installed on the vehicle 1, or may be included in an external device outside the vehicle 1. Alternatively, the database management device 30 may be distributed to the vehicle 1 and the external device.

1-2. Road Marking Map Information

In the present embodiment, we especially consider management of the map information regarding a "road marking". The road marking is a marking that is drawn on a road surface. The road marking is exemplified by a stop line, a pedestrian crossing (a crosswalk), a lane marking, and so forth. The lane marking, which is the road marking defining a lane, includes a lane boundary line and a center line.

The stop line is further classified into a mandatory stop line (a must-stop line) obligating to stop and another stop line. Every vehicle is required to always stop before the mandatory stop line. Typically, a stop sign instructing to stop and/or a character road marking "STOP" is placed in the vicinity of the mandatory stop line. On the other hand, the vehicle stops before a stop line other than the mandatory stop line if necessary. For example, when a stop line is arranged before a traffic light and the traffic light is a red light, the vehicle stops before the stop line. As another example, when a stop line is arranged before a pedestrian crossing and a pedestrian is crossing the pedestrian crossing, the vehicle stops before the stop line.

The map database MAP_DB according to the present embodiment includes road marking map information RM_MAP regarding a "specific road marking RM". The specific road marking RM includes at least one of the stop line and the pedestrian crossing. Meanwhile, the specific road marking RM does not include the lane marking.

The road marking map information RM_MAP indicates a position of the specific road marking RM. The road marking map information RM_MAP may indicate a position of the specific road marking RM and an "evaluation value" that are associated with each other. The evaluation value indicates "certainty" that the specific road marking RM actually exists at the position indicated by the road marking map information RM_MAP. The certainty can be reworded as accuracy or reliability. The evaluation value can be reworded as a score.

Figure 2:
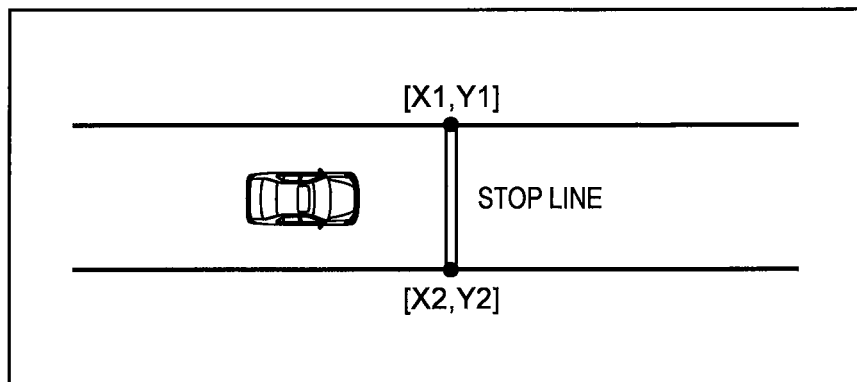
FIG. 2 is a conceptual diagram for explaining an example of road marking map information regarding a stop line in the embodiment of the present disclosure.

FIG. 2 conceptually shows an example of the road marking map information RM_MAP regarding the stop line. The road marking map information RM_MAP regarding the stop line indicates the position of the stop line. Typically, the stop line is a white line having a linear shape. In that case, the position of the stop line is expressed by positions [X1, Y1] and [X2, Y2] of both ends of the line.

In the example shown in FIG. 2, the road marking map information RM_MAP indicates a stop line evaluation value Psl and a mandatory stop line evaluation value Pmsl in addition to the position. The position, the stop line evaluation value Psl, and the mandatory stop line evaluation value Pmsl are associated with each other. The stop line evaluation value Psl indicates certainty that the stop line actually exists at the position indicated by the road marking map information RM_MAP. The mandatory stop line evaluation value Pmsl indicates certainty that the mandatory stop line actually exists at the position indicated by the road marking map information RM_MAP. When the stop line evaluation value Psl is high and the mandatory stop line evaluation value Pmsl also is high, the mandatory stop line is likely to exist at the position. On the other hand, when the stop line evaluation value Psl is high and the mandatory stop line evaluation value Pmsl is low, the stop line other than the mandatory stop line is likely to exist at the position.

Figure 3:
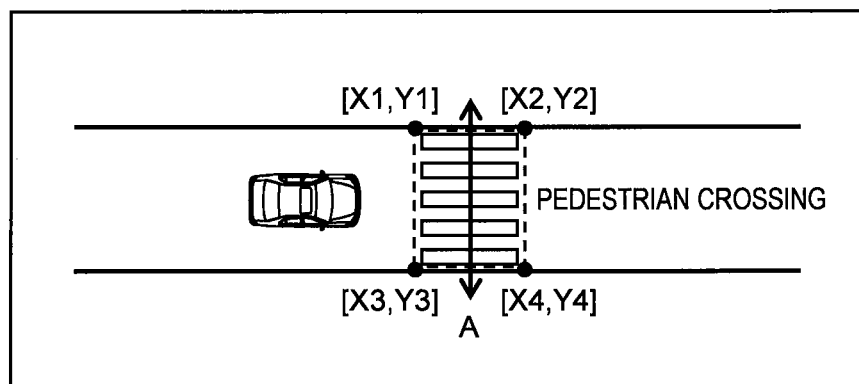
FIG. 3 is a conceptual diagram for explaining an example of road marking map information regarding a pedestrian crossing in the embodiment of the present disclosure.

FIG. 3 conceptually shows an example of the road marking map information RM_MAP regarding the pedestrian crossing. The road marking map information RM_MAP regarding the pedestrian crossing indicates a position of the pedestrian crossing. Typically, the pedestrian crossing has a stripe pattern that a plurality of white lines are arranged in parallel, and has a rectangle shape as a whole. In that case, the position of the pedestrian crossing is expressed by positions [Xi, Yi] (i=1 to 4) of four corners of the rectangle shape.

The road marking map information RM_MAP regarding the pedestrian crossing further indicates an arrangement direction A of the pedestrian crossing. The arrangement direction A is a direction orthogonal to the plurality of parallel lines constituting the pedestrian crossing.

In the example shown in FIG. 3, the road marking map information RM_MAP indicates a pedestrian crossing evaluation value Ppc in addition to the position and the arrangement direction A. The position, the arrangement direction A, and the pedestrian crossing evaluation value Ppc are associated with each other. The pedestrian crossing evaluation value Ppc indicates certainty that the pedestrian crossing actually exists at the position indicated by the road marking map information RM_MAP. When the pedestrian crossing evaluation value Ppc is high, the pedestrian crossing is likely to exist at the position indicated by the road marking map information RM_MAP.

1-3. Database Management Device

The database management device 30 according to the present embodiment manages the road marking map information RM_MAP. The management of the road marking map information RM_MAP includes at least one of generation and update of the road marking map information RM_MAP.

More specifically, the database management device 30 detects a candidate for the specific road marking RM around the vehicle 1. The candidate for the specific road marking RM around the vehicle 1 is hereinafter referred to as a "road marking candidate". The road marking candidate includes at least one of a "stop line candidate" being a candidate for the stop line and a "pedestrian crossing candidate" being a candidate for the pedestrian crossing. The road marking candidate is detectable based on the above-described driving environment information 200 (e.g. the surrounding situation information) acquired at the vehicle 1.

Subsequently, the database management device 30 determines an "evaluation value" regarding the detected road marking candidate. The evaluation value indicates "certainty" of the detected road marking candidate being the specific road marking RM. The certainty of the detected road marking candidate being the specific road marking RM is equivalent to the certainty that the specific road marking RM actually exists at the detection position of the road marking candidate, that is, the evaluation value (Psl, Pmsl, Ppc) described in FIGS. 2 and 3. For example, the certainty of the detected stop line candidate being the stop line is equivalent to the certainty that the stop line actually exists at the detection position of the stop line candidate, that is, the stop line evaluation value Psl described above.

Figure 4:
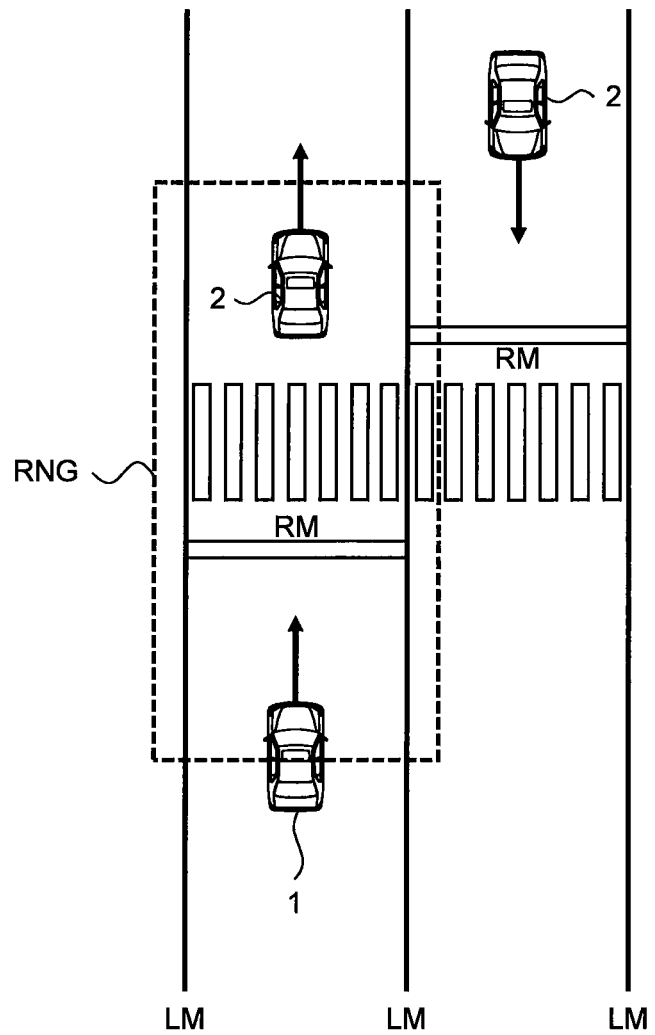
FIG. 4 is a conceptual diagram for explaining a method of determining an evaluation value by a database management device according to the embodiment of the present disclosure.

A method of determining the evaluation value by the database management device 30 according to the present embodiment will be described with reference to FIG. 4. Not only the specific road marking RM such as the stop line and the pedestrian crossing but also the lane marking LM such as a lane boundary line and a center line exists on the road surface. The road marking candidate detected based on the driving environment information 200 may erroneously include the lane marking LM.

However, vehicle behavior of the vehicle 1 with respect to the specific road marking RM is totally different from vehicle behavior of the vehicle 1 with respect to the lane marking LM. It is therefore possible to determine (verify), based on the vehicle behavior of the vehicle 1, whether or not the road marking candidate is the specific road marking RM. In other words, it is possible to determine the evaluation value based on the vehicle behavior of the vehicle 1. The vehicle behavior of the vehicle 1 can be recognized based on the above-described driving environment information 200 (e.g. the vehicle position information, the vehicle state information) acquired at the vehicle 1.

The same applies to vehicle behavior of another vehicle 2 around the vehicle 1. Vehicle behavior of said another vehicle 2 with respect to the specific road marking RM is totally different from vehicle behavior of said another vehicle 2 with respect to the lane marking LM. It is therefore possible to determine (verify), based on the vehicle behavior of another vehicle 2, whether or not the road marking candidate is the specific road marking RM. In other words, it is possible to determine the evaluation value based on the vehicle behavior of another vehicle 2. The vehicle behavior of another vehicle 2 can be recognized based on the above-described driving environment information 200 (e.g. the surrounding situation information) acquired at the vehicle 1.

The database management device 30 recognizes the vehicle behavior of at least one of the vehicle 1 and another vehicle 2 with respect to the road marking candidate, based on the driving environment information 200. More specifically, the database management device 30 recognizes the vehicle behavior of at least one of the vehicle 1 and another vehicle 2 in a period when passing the road marking candidate, based on the driving environment information 200. For example, the database management device 30 recognizes the vehicle behavior in a certain section RNG including the position of the road marking candidate. Then, based on the recognized vehicle behavior, the database management device 30 determines the evaluation value that indicates certainty of the road marking candidate being the specific road marking RM.

Furthermore, the database management device 30 registers the road marking candidate having the evaluation value equal to or higher than a threshold, as the specific road marking RM, in the road marking map information RM_MAP. More specifically, the database management device 30 registers the position of the specific road marking RM in the road marking map information RM_MAP. The database management device 30 may register the position of the specific road marking RM and the evaluation value associated with each other, in the road marking map information RM_MAP (see FIGS. 2 and 3).

The database management device 30 may update the road marking map information RM_MAP. For example, when the vehicle 1 repeatedly travels a same road, an identical road marking RM is repeatedly detected and information on the identical road marking RM is repeatedly acquired. Therefore, the database management device 30 can update information regarding the specific road marking RM (i.e. a registered road marking) that is already registered in the road marking map information RM_MAP. For example, the database management device 30 updates the evaluation value regarding the registered road marking, based on the vehicle behavior with respect to the road marking candidate corresponding to the registered road marking.

The function of the database management device 30 can be achieved by the following functional blocks. A road marking candidate detection unit detects the road marking candidate around the vehicle 1, based on the driving environment information 200. A vehicle behavior recognition unit recognizes the vehicle behavior of at least one of the vehicle 1 and another vehicle 2 in a period when passing the road marking candidate, based on the driving environment information 200. An evaluation value determination unit determines, based on the vehicle behavior, the evaluation value that indicates certainty of the road marking candidate being the specific road marking RM. The map information update unit registers the road marking candidate having the evaluation value equal to or higher than the threshold, as the specific road marking RM, in the road marking map information RM_MAP. The map information update unit may update the evaluation value regarding the registered road marking, based on the vehicle behavior with respect to the road marking candidate corresponding to the registered road marking. These functional blocks are realized by a processor executing a computer program stored in a memory device. The processor may be installed on the vehicle 1, or may be included in an external device outside the vehicle 1. Alternatively, the processor may be distributed to the vehicle 1 and the external device. In that case, the function of the database management device 30 is divisionally handled by the vehicle 1 and the external device.

1-4. Effects

According to the present embodiment, as described above, the database management device 30 detects the road marking candidate around the vehicle 1, and determines the evaluation value that indicates certainty of the detected road marking candidate being the specific road marking RM. More specifically, the database management device 30 recognizes the vehicle behavior of at least one of the vehicle 1 and another vehicle 2 in a period when passing the road marking candidate, based on the driving environment information 200. The vehicle behavior with respect to the specific road marking RM is totally different from the vehicle behavior with respect to other road markings (e.g. the lane marking LM). Therefore, using the vehicle behavior makes it possible to determine the evaluation value regarding the specific road marking RM with high accuracy.

As a comparative example, let us consider a case of determining whether or not the road marking candidate is the specific road marking RM based on brightness of road surface image. Not only the specific road marking RM such as the stop line and the pedestrian crossing but also the lane marking LM such as a lane boundary line and a center line exists on the road surface (see FIG. 4). The specific road marking RM and the lane marking LM each has high brightness. Therefore, it is not possible to determine with high accuracy whether or not the road marking candidate is the specific road marking RM based on the brightness of the road surface image. That is, it is not possible to determine the evaluation value with high accuracy.

According to the present embodiment, the road marking candidate having the evaluation value equal to or higher than the threshold is registered as the specific road marking RM in the road marking map information RM_MAP. The evaluation value being determined with high accuracy causes increase in accuracy (quality) of the road marking map information RM_MAP that is automatically generated based on the evaluation value. Moreover, when the road marking map information RM_MAP indicates the position and the evaluation value, improvement in the evaluation value leads directly to increase in accuracy (quality) of the road marking map information RM_MAP. Since the accuracy of the road marking map information RM_MAP is increased, accuracy of the driving support control using the road marking map information RM_MAP also is increased.

The database management device 30 may update the road marking map information RM_MAP. Such the update processing causes further increase in the accuracy (quality) of the road marking map information RM_MAP. As a result, the accuracy of the driving support control using the road marking map information RM_MAP also is further increased.

The map database MAP_DB and the database management device 30 may be installed on the vehicle 1. That is to say, all components of the map information system 10 may be installed on the vehicle 1. In that case, the map information system 10 automatically executes, in the vehicle 1, all of the acquisition of the driving environment information 200, the management of the map database MAP_DB based on the driving environment information 200, and the driving support control based on the map database MAP_DB. Such the map information system 10 can be referred to as a "self-learning driving support control system". In particular, when executing the automated driving control as the driving support control, such the map information system 10 can be referred to as a "self-learning automated driving system".

It can be said that the map database MAP_DB is useful knowledge for the driving support control. It can be said that the map information system 10 according to the present embodiment automatically executes detection, verification, and accumulation of the knowledge.

Hereinafter, the map information system 10 according to the present embodiment will be described in more detail.

2. Configuration Example of Map Information System 10

2-1. Configuration Example of Driving Support Control Device 100

Figure 5:
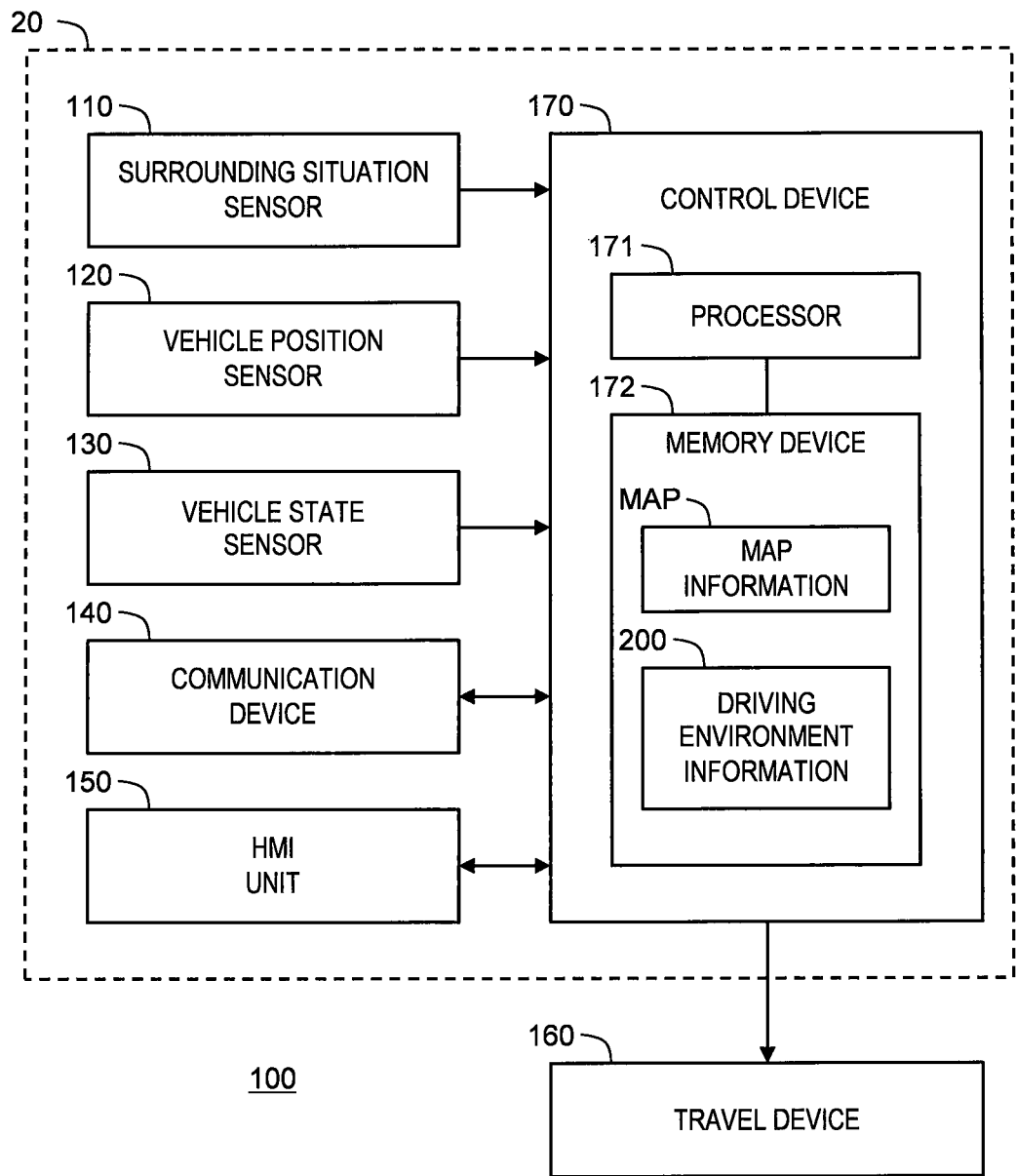
FIG. 5 is a block diagram showing a configuration example of a driving support control device according to the embodiment of the present disclosure.

FIG. 5 is a block diagram showing a configuration example of the driving support control device 100 according to the present embodiment. The driving support control device 100 is installed on the vehicle 1 and includes a surrounding situation sensor 110, a vehicle position sensor 120, a vehicle state sensor 130, a communication device 140, an HMI (Human Machine Interface) unit 150, a travel device 160, and a control device (controller) 170.

The surrounding situation sensor 110 detects (recognizes) a situation around the vehicle 1. The surrounding situation sensor 110 is exemplified by a camera (imaging device), a LIDAR (Laser Imaging Detection and Ranging), a radar, and so forth. The camera images a situation around the vehicle 1. The LIDAR uses laser beams to detect a target around the vehicle 1. The radar uses radio waves to detect a target around the vehicle 1.

The vehicle position sensor 120 detects a position and an orientation (e.g. azimuth) of the vehicle 1. For example, the vehicle position sensor 120 includes a GPS (Global Positioning System) sensor. The GPS sensor receives signals transmitted from a plurality of GPS satellites and calculates the position and the orientation of the vehicle 1 based on the received signals.

The vehicle state sensor 130 detects a state of the vehicle 1. The state of the vehicle 1 includes a speed of the vehicle 1 (i.e. a vehicle speed), an acceleration, a steering angle, a yaw rate, and so forth. The state of the vehicle 1 further includes a driving operation by a driver of the vehicle 1. The driving operation includes an acceleration operation, a braking operation, and a steering operation.

The communication device 140 communicates with the outside of the vehicle 1. For example, the communication device 140 communicates with an external device outside the vehicle 1 through a communication network. The communication device 140 may perform a V2I communication (vehicle-to-infrastructure communication) with a surrounding infrastructure. The communication device 140 may perform a V2V communication (vehicle-to-vehicle communication) with a surrounding vehicle.

The HMI unit 150 is an interface for proving the driver with information and receiving information from the driver. More specifically, the HMI unit 150 includes an input device and an output device. The input device is exemplified by a touch panel, a switch, a microphone, and the like. The output device is exemplified by a display device, a speaker, and the like.

The travel device 160 includes a steering device, a driving device, and a braking device. The steering device turns wheels. The driving device is a power source that generates a driving force. The driving device is exemplified by an engine and an electric motor. The braking device generates a braking force.

The control device (controller) 170 is a microcomputer including a processor 171 and a memory device 172. The control device 170 is also called an ECU (Electronic Control Unit). A variety of processing by the control device 170 is achieved by the processor 171 executing a control program stored in the memory device 172.

For example, the control device 170 acquires necessary map information MAP from the map database MAP_DB. The map information MAP includes the road marking map information RM_MAP described above. In addition, the map information MAP includes a road map and a navigation map commonly used. In a case where the map database MAP_DB is installed on the vehicle 1, the control device 170 acquires necessary map information MAP from the map database MAP_DB. In another case where the map database MAP_DB exists outside the vehicle 1, the control device 170 acquires necessary map information MAP through the communication device 140. The map information MAP is stored in the memory device 172 and read out from the memory device 172 to be used, as appropriate.

Moreover, the control device 170 acquires the driving environment information 200. The driving environment information 200 is stored in the memory device 172 and read out from the memory device 172 to be used, as appropriate.

Figure 6:
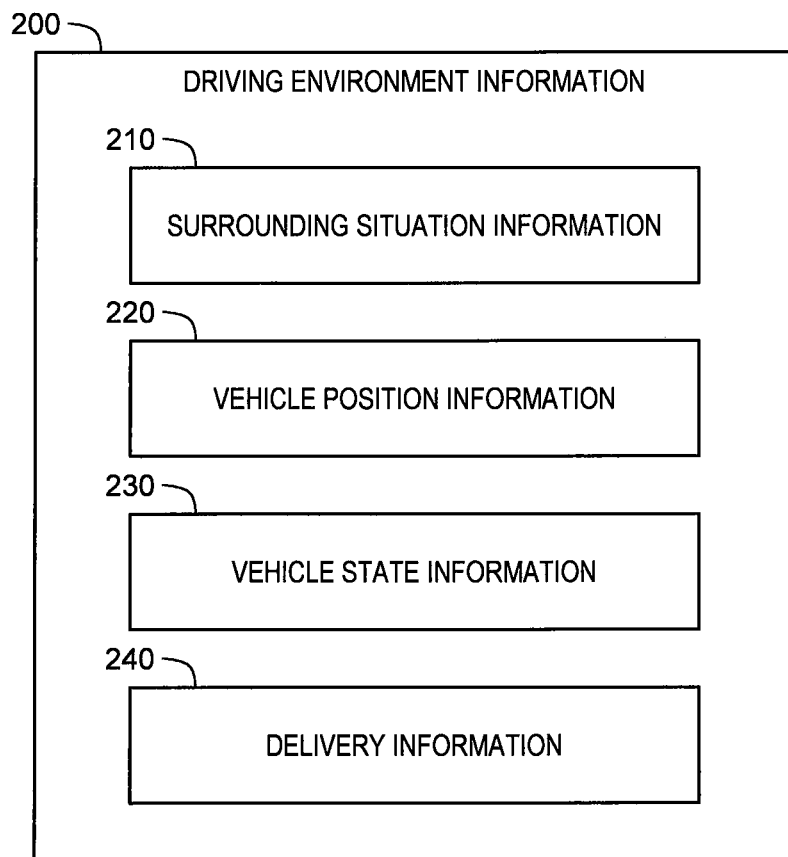
FIG. 6 is a block diagram showing an example of driving environment information used in the embodiment of the present disclosure.

FIG. 6 is a block diagram showing an example of the driving environment information 200. The driving environment information 200 includes surrounding situation information 210, vehicle position information 220, vehicle state information 230, and delivery information 240.

The surrounding situation information 210 indicates the situation around the vehicle 1. The surrounding situation information 210 is information obtained from a result of detection by the surrounding situation sensor 110. For example, the surrounding situation information 210 includes image information obtained by the camera. The surrounding situation information 210 may include measurement information obtained by the LIDAR and the radar. The surrounding situation information 210 may include target information regarding a target detected based on the image information and the measurement information. The target around the vehicle 1 is exemplified by a surrounding vehicle, a pedestrian, a white line, a roadside structure, a sign, and so forth. The target information includes a relative position, a relative velocity, and the like of the detected target. The control device 170 acquires the surrounding situation information 210 based on the result of detection by the surrounding situation sensor 110.

The vehicle position information 220 indicates the position and the orientation of the vehicle 1. The control device 170 acquires the vehicle position information 220 from the vehicle position sensor 120. Furthermore, the control device 170 may execute a well-known localizing processing by the use of the target information included in the surrounding situation information 210 to increase accuracy of the vehicle position information 220.

The vehicle state information 230 indicates the state of the vehicle 1. The state of the vehicle 1 includes the speed of the vehicle 1 (i.e. the vehicle speed), the acceleration, the steering angle, the yaw rate, and so forth. The state of the vehicle 1 further includes the driving operation by the driver of the vehicle 1. The driving operation includes the acceleration operation, the braking operation, and the steering operation. The control device 170 acquires the vehicle state information 230 from the vehicle state sensor 130.

The delivery information 240 is information acquired through the communication device 140. The control device 170 acquires the delivery information 240 by using the communication device 140 to communicate with the outside of the vehicle 1. For example, the delivery information 240 includes road traffic information (e.g. road work zone information, accident information, traffic restriction information, traffic jam information) delivered from an infrastructure. The delivery information 240 may include information on the surrounding vehicle acquired through the V2V communication.

Furthermore, the control device 170 executes the driving support control based on the map information MAP and the driving environment information 200. The driving support control is exemplified by the automated driving control, the trajectory-following control, the lane keep assist control, the collision avoidance control, and so forth. For the purpose of the driving support control, the control device 170 executes vehicle travel control as appropriate. The vehicle travel control includes steering control, acceleration control, and deceleration control. The control device 170 executes the steering control, the acceleration control, and the deceleration control by appropriately actuating the travel device 160 (i.e. the steering device, the driving device, and the braking device). It can be said that the control device 170 and the travel device 160 constitute a "vehicle travel control device" that executes the vehicle travel control.

As an example of the driving support control, let us consider a case where the control device 170 executes the automated driving control. The control device 170 generates a travel plan for the vehicle 1 based on the map information MAP and the driving environment information 200. The travel plan includes a target route to a destination and a local target trajectory (e.g. a target trajectory within a lane, a target trajectory for a lane change). Moreover, the travel plan includes a vehicle travel control plan for traveling so as to follow the target trajectory, following a traffic rule, avoiding an obstacle, and so forth. The control device 170 executes the vehicle travel control such that the vehicle 1 travels in accordance with the travel plan.

2-2. Configuration Example of Information Acquisition Device 20

The information acquisition device 20 acquires the driving environment information 200. As shown in FIG. 5, the surrounding situation sensor 110, the vehicle position sensor 120, the vehicle state sensor 130, the communication device 140, and the control device 170 constitute the information acquisition device 20.

2-3. Configuration Example of Database Management Device 30

2-3-1. First Configuration Example

Figure 7:
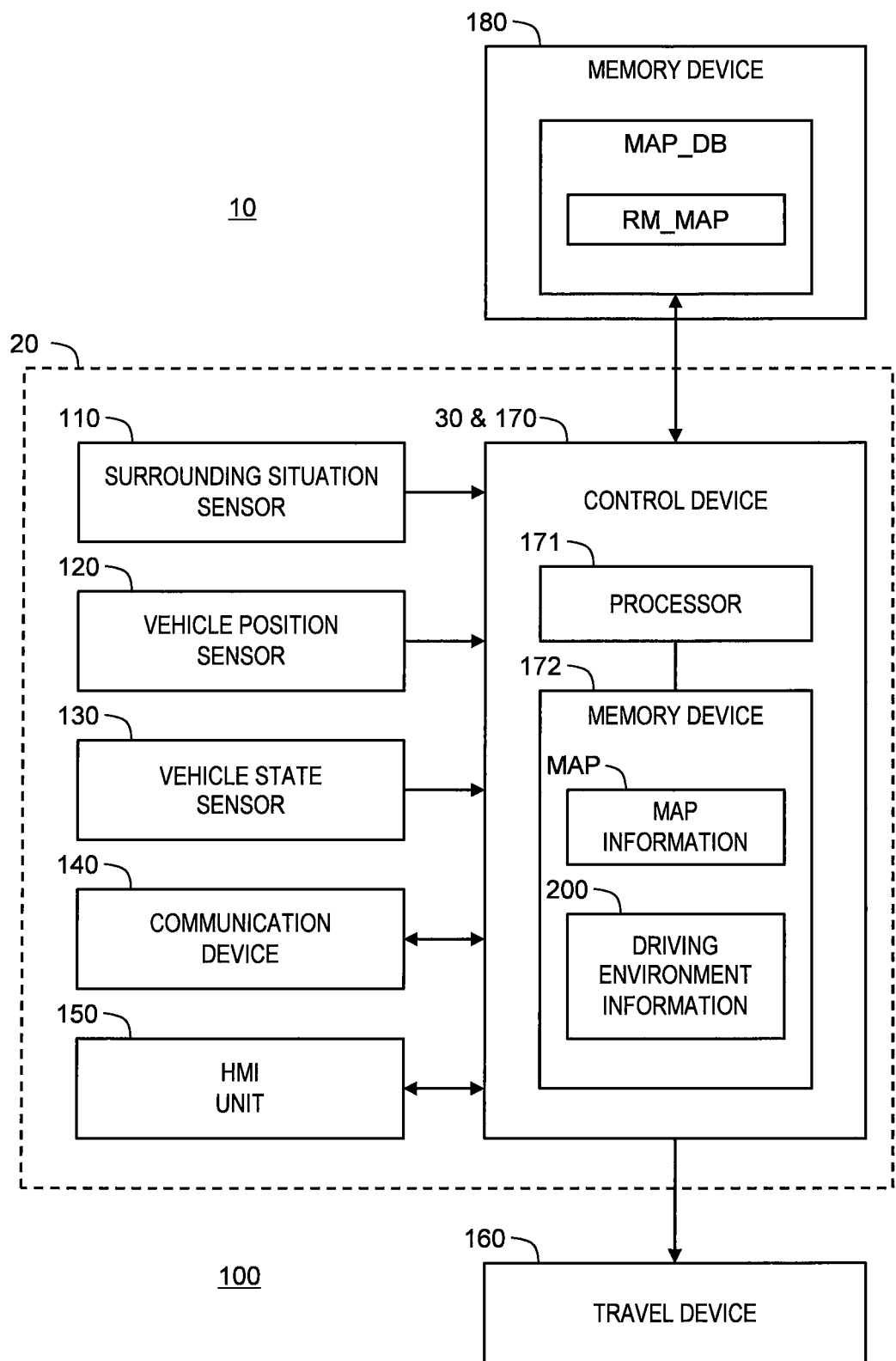
FIG. 7 is a block diagram showing a first configuration example of the database management device according to the embodiment of the present disclosure.

FIG. 7 is a block diagram showing a first configuration example of the database management device 30. In the first configuration example, the map database MAP_DB is installed on the vehicle 1 (the driving support control device 100). More specifically, the map database MAP_DB is stored in a memory device 180. The memory device 180 may be the same as the memory device 172 of the control device 170. The control device 170 (i.e. the processor 171) manages the map database MAP_DB based on the driving environment information 200. That is to say, the control device 170 serves as the database management device 30.

2-3-2. Second Configuration Example

Figure 8:
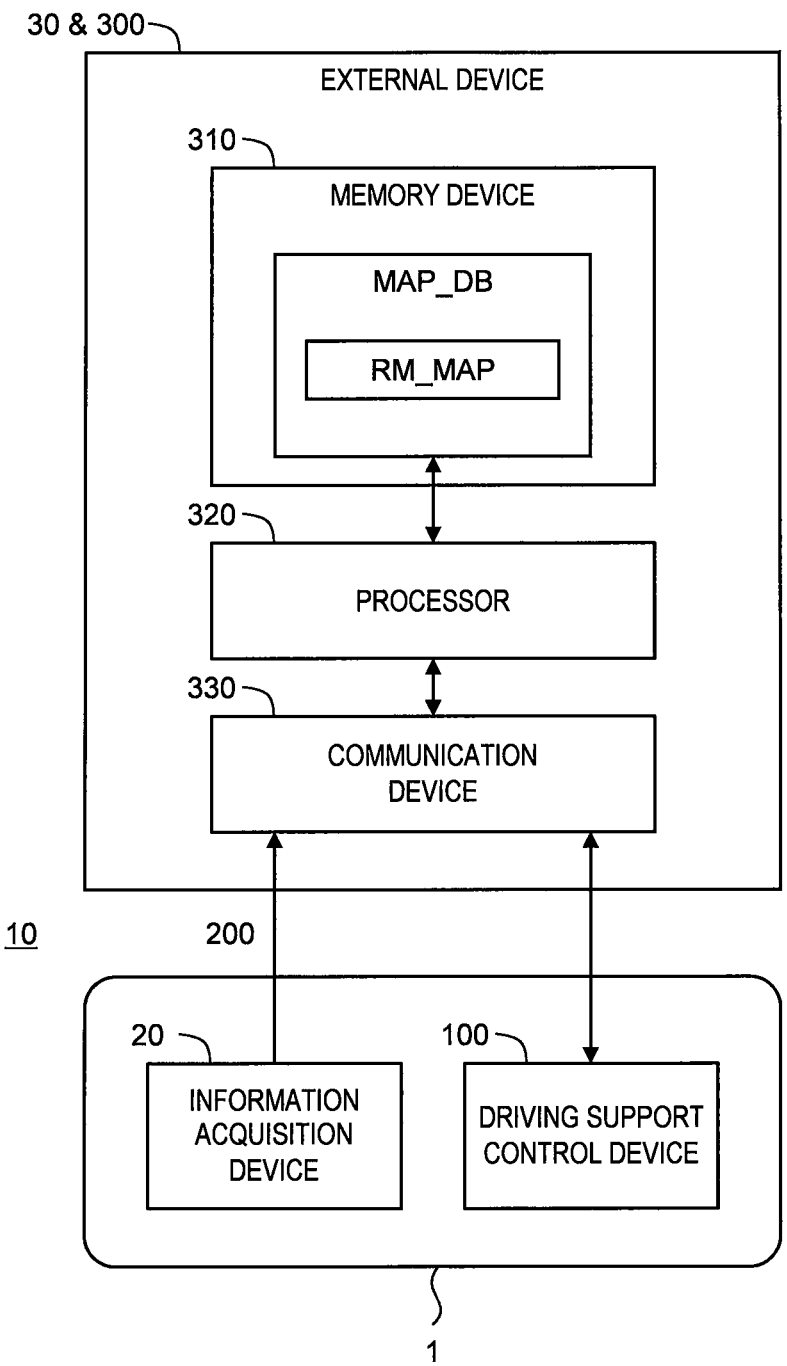
FIG. 8 is a block diagram showing a second configuration example of the database management device according to the embodiment of the present disclosure.

FIG. 8 is a block diagram showing a second configuration example of the database management device 30. In the second configuration example, the database management device 30 is realized by an external device 300 outside the vehicle 1. For example, the external device 300 is a management server.

More specifically, the external device 300 includes a memory device 310, a processor 320, and a communication device 330. The map database MAP_DB is stored in the memory device 310. The communication device 330 communicates with the communication device 140 of the vehicle 1. The processor 320 performs a variety of information processing by executing a computer program stored in the memory device 310.

The information acquisition device 20 (i.e. the control device 170) of the vehicle 1 transmits the driving environment information 200 to the external device 300 through the communication device 140. The processor 320 of the external device 300 receives the driving environment information 200 from the information acquisition device 20 through the communication device 330. Then, the processor 320 manages the map database MAP_DB based on the driving environment information 200.

Moreover, the driving support control device 100 (i.e. the control device 170) of the vehicle 1 sends a request for provision of necessary map information MAP to the external device 300 through the communication device 140. The processor 320 of the external device 300 reads the necessary map information MAP from the map database MAP_DB. Then, the processor 320 provides the map information MAP to the driving support control device 100 through the communication device 330.

2-3-3. Third Configuration Example

Figure 9:
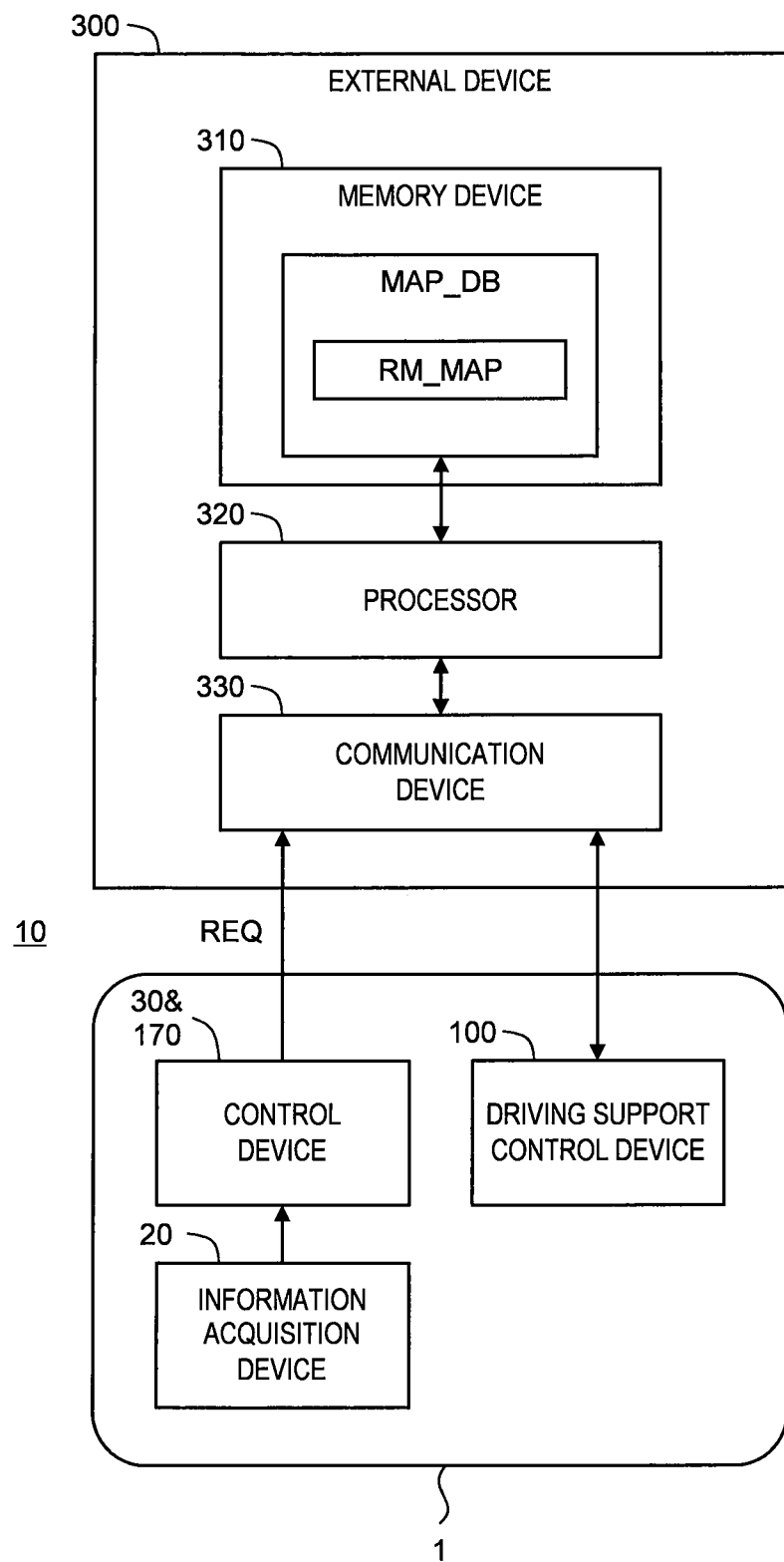
FIG. 9 is a block diagram showing a third configuration example of the database management device according to the embodiment of the present disclosure.

FIG. 9 is a block diagram showing a third configuration example of the database management device 30. In the third configuration example, the map database MAP_DB is stored in the external device 300, as in the case of the second configuration example. Meanwhile, the database management device 30 is realized by the control device 170 of the vehicle 1. That is, the control device 170 (i.e. the processor 171) remotely manipulates the map database MAP_DB on the side of the external device 300.

More specifically, the control device 170 acquires the driving environment information 200 from the information acquisition device 20. Based on the driving environment information 200, the control device 170 executes processing such as detecting the road marking candidate, recognizing the vehicle behavior, and determining the evaluation value. When performing registration or update of the road marking map information RM_MAP, the control device 170 transmits a request signal REQ requesting for registration or update to the external device 300 through the communication device 140. The request signal REQ includes information necessary for the registration or the update. The processor 320 of the external device 300 receives the request signal REQ through the communication device 330. Then, the processor 320 performs the registration or the update of the road marking map information RM_MAP in accordance with the request signal REQ.

2-3-4. Fourth Configuration Example

The functions of the database management device 30 may be distributed to the control device 170 (i.e. the processor 171) of the vehicle 1 and the processor 320 of the external device 300. That is, the above-described functional blocks such as the road marking candidate detection unit, the vehicle behavior recognition unit, the evaluation value determination unit, and the map information update unit may be distributed to the control device 170 (i.e. the processor 171) and the processor 320.

It is possible to summarize the first to fourth configuration examples as follows. That is, one processor (i.e. the processor 171 or the processor 320) or multiple processors (i.e. the processor 171 and the processor 320) serve as the database management device 30.

3. Processing by Database Management Device 30

Figure 10:
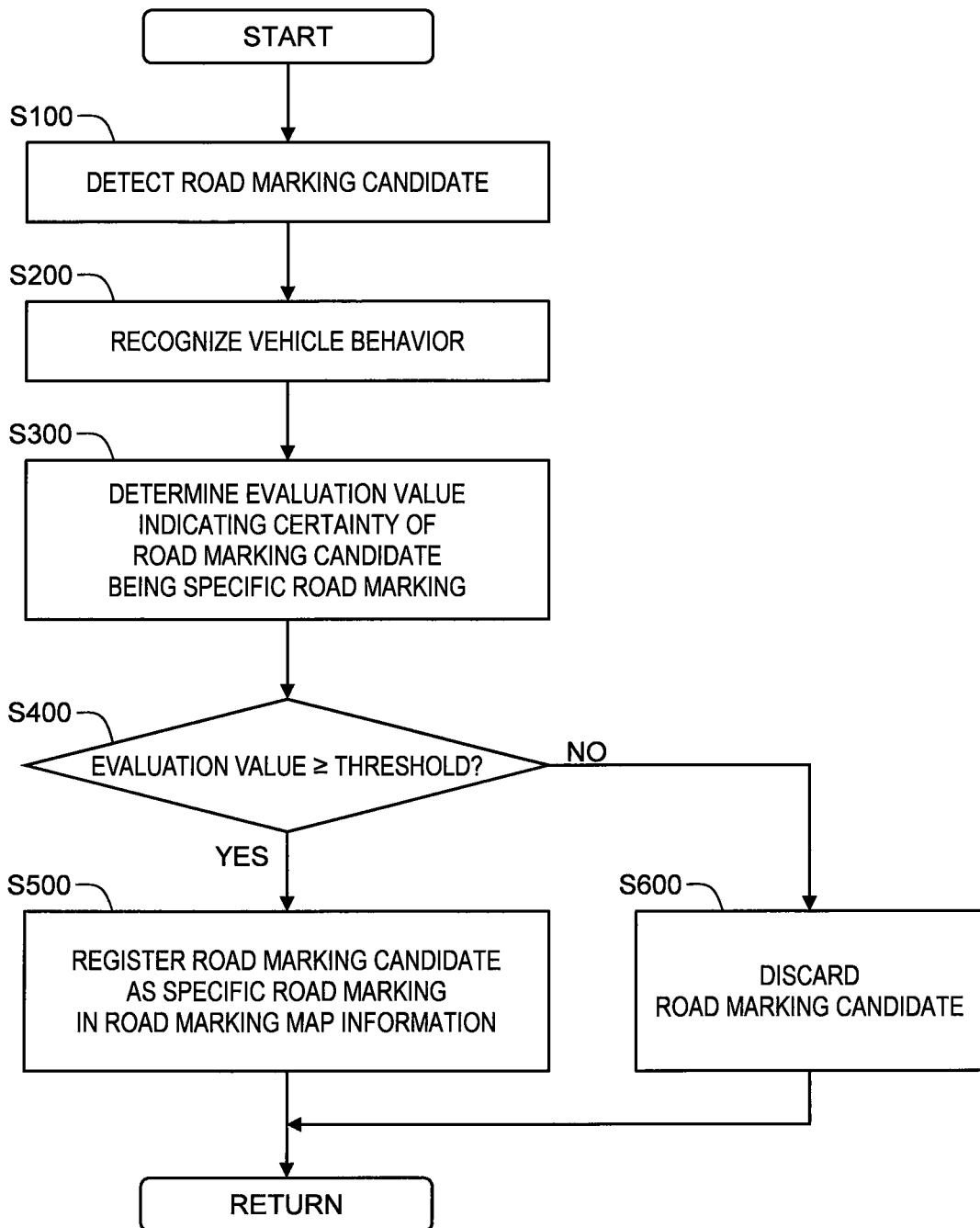
FIG. 10 is a flow chart showing processing by the database management device according to the embodiment of the present disclosure.

FIG. 10 is a flow chart showing processing by the database management device 30 according to the present embodiment. The process flow shown in FIG. 10 is repeatedly executed every certain cycle.

3-1. Step S100

The database management device 30 acquires the driving environment information 200 from the information acquisition device 20. Then, the database management device 30 detects the road marking candidate based on the surrounding situation information 210.

For example, the surrounding situation information 210 includes the image information obtained by the camera. The database management device 30 converts the image information to that in the absolute coordinate system based on the position and the orientation of the vehicle 1 indicated by the vehicle position information 220. Then, the database management device 30 uses the image information in the absolute coordinate system to generate road surface image representing the road surface. Alternatively, the road surface image may be generated from road surface point cloud measured by the LIDAR, instead of the image information. In this manner, road surface image information is obtained from the surrounding situation information 210. The database management device 30 may register the road surface image information in the map database MAP_DB.

It should be noted that the process of generating the road surface image information from the surrounding situation information 210 may be executed by the information acquisition device 20. In that case, the database management device 30 acquires the surrounding situation information 210 including the road surface image information from the information acquisition device 20.

Subsequently, the database management device 30 extracts the road marking candidate from the road surface image indicated by the road surface image information. For example, the database management device 30 executes binarization processing or edge detection processing to extract a white line that seems to be the stop line from the road surface image. A prescribed width of the stop line in Japan is from 0.3 m to 0.45 m. A white line that deviates from the prescribed width a little may also be extracted in consideration of variability and blurring of the white line. The same applies to the pedestrian crossing. The database management device 30 extracts a stripe area that seems to be the pedestrian crossing from the road surface image, in consideration of a prescribed width and variability of the white line. Alternatively, the database management device 30 may extract the road marking candidate from the road surface image by utilizing an extraction tool generated through machine learning.

It should be noted that the road marking candidate may include not only the specific road marking RM such as the stop line and the pedestrian crossing but also the lane marking LM such as the lane boundary line and the center line.

3-2. Step S200

The vehicle 1 passes the road marking candidate detected in Step S100. The database management device 30 recognizes vehicle behavior of the vehicle 1 in a period when passing the road marking candidate. For example, the database management device 30 recognizes the vehicle behavior of the vehicle 1 in the certain section RNG including the position of the road marking candidate (see FIG. 4). The vehicle behavior of the vehicle 1 can be recognized based on at least one of the vehicle position information 220 and the vehicle state information 230.

As another example, another vehicle 2 (see FIG. 4) passes the road marking candidate detected in Step S100. The database management device 30 recognizes vehicle behavior of said another vehicle 2 in a period when passing the road marking candidate. For example, the database management device 30 recognizes the vehicle behavior of another vehicle 2 in the certain section RNG including the position of the road marking candidate. The vehicle behavior of another vehicle 2 can be recognized based on the surrounding situation information 210. As another example, the vehicle behavior of another vehicle 2 may be recognized based on the delivery information 240 (specifically, V2V communication information).

In this manner, the database management device 30 recognizes the vehicle behavior of at least one of the vehicle 1 and another vehicle 2 in a period when passing the road marking candidate, based on the driving environment information 200.

3-3. Step S300

The database management device 30 determines, based on the vehicle behavior recognized in Step S200, the evaluation value that indicates certainty of the road marking candidate being the specific road marking RM. There are various examples of Steps S200 and S300. Various examples of Steps S200 and S300 will be described in the subsequent Section 4 in detail.

3-4. Step S400

The database management device 30 compares the evaluation value determined in Step S300 with a threshold. When the evaluation value is equal to or higher than the threshold (Step S400; Yes), the processing proceeds to Step S500. On the other hand, when the evaluation value is less than the threshold (Step S400; No), the processing proceeds to Step S600.

3-5. Step S500

The database management device 30 registers the road marking candidate as the specific road marking RM in the road marking map information RM_MAP. More specifically, the database management device 30 registers the position of the specific road marking RM in the road marking map information RM_MAP. The database management device 30 may register the position of the specific road marking RM and the evaluation value associated with each other, in the road marking map information RM_MAP (see FIGS. 2 and 3).

3-6. Step S600

The database management device 30 discards the road marking candidate having a low evaluation value.

4. Determination of Evaluation Value Based on Vehicle Behavior (Steps S200, S300)

Next, various examples of Steps S200 and S300 will be described.

4-1. First Example

Figure 11:
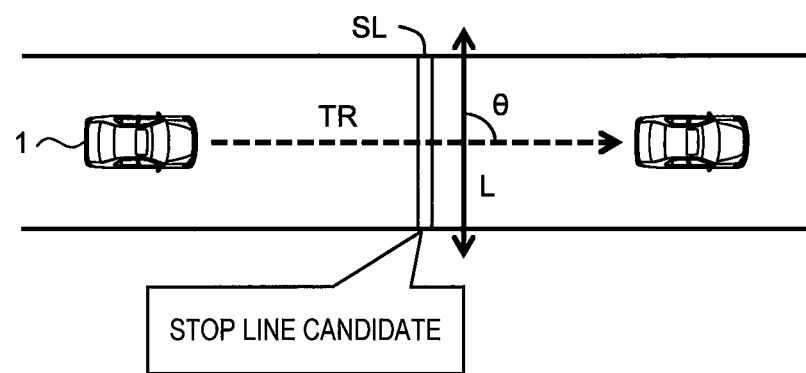
FIG. 11 is a conceptual diagram for explaining a first example of a method of determining the evaluation value based on vehicle behavior in the embodiment of the present disclosure.
Figure 12:
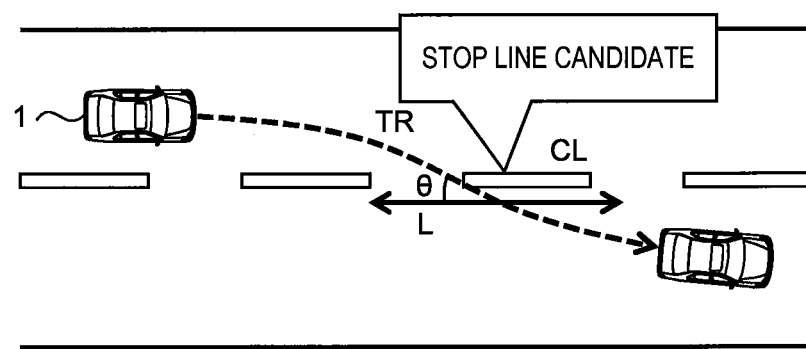
FIG. 12 is a conceptual diagram for explaining the first example of the method of determining the evaluation value based on vehicle behavior in the embodiment of the present disclosure.

FIGS. 11 and 12 are conceptual diagrams for explaining a first example. In the first example, we consider the "stop line candidate" being a candidate for the stop line SL. The stop line evaluation value Psl indicates certainty of the stop line candidate being the stop line SL. It should be noted that the stop line SL here includes the mandatory stop line.

FIG. 11 shows a situation where the vehicle 1 passes the stop line SL. In general, a trajectory TR of the vehicle 1 passing the stop line SL is almost orthogonal to a longitudinal direction L of the stop line SL. In other words, an angle θ between the trajectory TR of the vehicle 1 and the longitudinal direction L of the stop line SL is close to 90 degrees. On the other hand, FIG. 12 shows another situation where the vehicle 1 crosses a center line CL. An angle θ between the trajectory TR of the vehicle 1 and a longitudinal direction L of the center line CL is small. Therefore, it is possible to determine the stop line evaluation value Psl based on the angle θ.

More specifically, the database management device 30 recognizes the trajectory TR of the vehicle 1 passing the stop line candidate as the vehicle behavior, based on the vehicle position information 220. Then, the database management device 30 calculates an angle θ between the trajectory TR of the vehicle 1 and the longitudinal direction L of the stop line candidate. The database management device 30 increases the stop line evaluation value Psl as the angle θ is closer to 90 degrees. In other words, the database management device 30 calculates the stop line evaluation value Psl to be higher as the angle θ is closer to 90 degrees.

4-2. Second Example

A second example is a modification example of the first example. In the second example, a trajectory TR of another vehicle 2 (see FIG. 4) instead of the vehicle 1 is used. More specifically, the database management device 30 recognizes the trajectory TR of another vehicle 2 passing the stop line candidate as the vehicle behavior, based on the surrounding situation information 210. Then, the database management device 30 calculates an angle θ between the trajectory TR of said another vehicle 2 and the longitudinal direction L of the stop line candidate. The database management device 30 increases the stop line evaluation value Psl as the angle θ is closer to 90 degrees. In other words, the database management device 30 calculates the stop line evaluation value Psl to be higher as the angle θ is closer to 90 degrees.

4-3. Third Example

Figure 13:
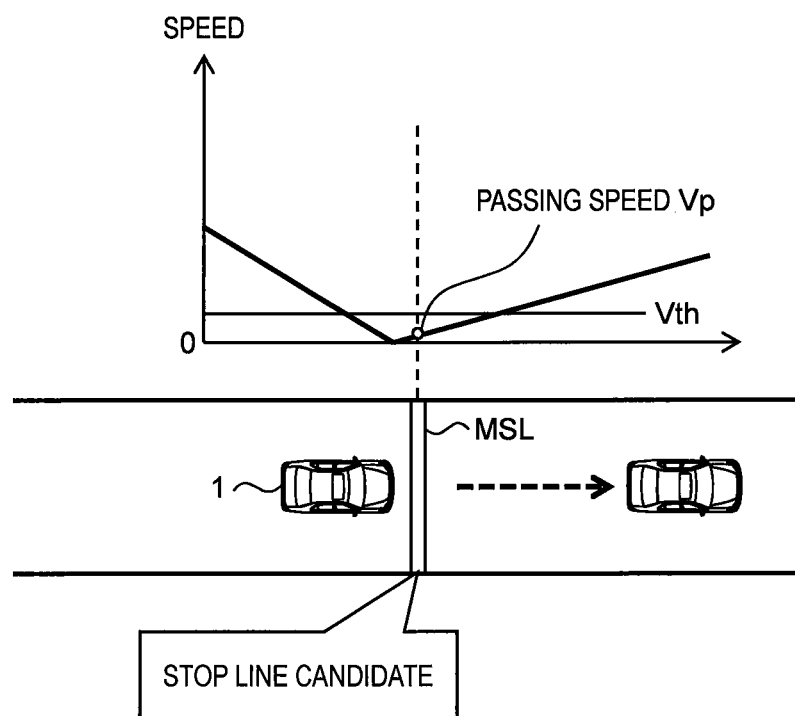
FIG. 13 is a conceptual diagram for explaining a third example of the method of determining the evaluation value based on vehicle behavior in the embodiment of the present disclosure.
Figure 14:
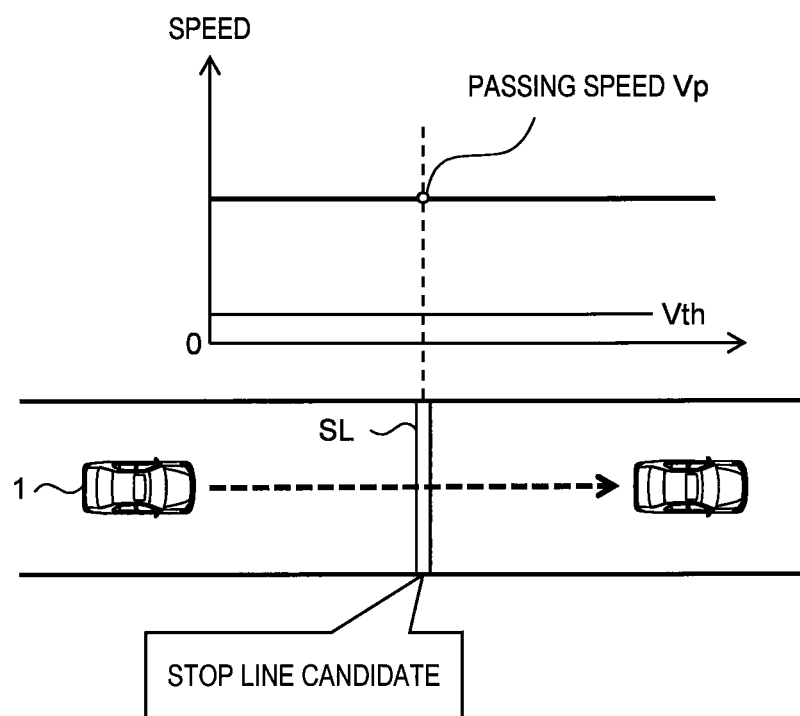
FIG. 14 is a conceptual diagram for explaining the third example of the method of determining the evaluation value based on vehicle behavior in the embodiment of the present disclosure.

FIGS. 13 and 14 are conceptual diagrams for explaining a third example. In the third example, we consider the mandatory stop line MSL. The mandatory stop line evaluation value Pmsl indicates certainty of the stop line candidate being the mandatory stop line MSL. When the vehicle 1 passes the stop line candidate, the database management device 30 determines the mandatory stop line evaluation value Pmsl in addition to the stop line evaluation value Psl described in the above first and second examples.

FIG. 13 shows a speed when the vehicle 1 passes the mandatory stop line MSL. The vehicle 1 is required to always stop before the mandatory stop line MSL. Therefore, the speed of the vehicle 1 on the mandatory stop line MSL is generally low. On the other hand, FIG. 14 shows a speed when the vehicle 1 passes the stop line SL other than the mandatory stop line MSL. The vehicle 1 does not necessarily stop before the stop line SL. It is therefore possible to determine the mandatory stop line evaluation value Pmsl based on the speed of the vehicle 1 on the stop line candidate. It should be noted that "on the stop line candidate" here means a position of the stop line candidate and its vicinity.

More specifically, the database management device 30 recognizes the speed of the vehicle 1 on the stop line candidate (hereinafter referred to as a "passing speed Vp") as the vehicle behavior, based on the vehicle state information 230. Then, the database management device 30 increases the mandatory stop line evaluation value Pmsl as the passing speed Vp is lower. In other words, the database management device 30 calculates the mandatory stop line evaluation value Pmsl to be higher as the passing speed Vp is lower.

Alternatively, the database management device 30 may compare the passing speed Vp with a speed threshold Vth. An "increase condition" is that the passing speed Vp is lower than the speed threshold Vth. When the increase condition is satisfied, the database management device 30 increases the mandatory stop line evaluation value Pmsl from a reference value. On the other hand, a "decrease condition" is that the passing speed Vp is equal to or higher than the speed threshold Vth. When the decrease condition is satisfied, the database management device 30 decreases the mandatory stop line evaluation value Pmsl from the reference value.

4-4. Fourth Example

There may be a case where the passing speed Vp on the stop line SL other than the mandatory stop line MSL happens to be low due to traffic jam and the like. In that case, the mandatory stop line evaluation value Pmsl may become high despite the stop line SL. In view of the above, a fourth example proposes a method for further increasing accuracy of the mandatory stop line evaluation value Pmsl. The fourth example is implemented in combination with the third example.

Figure 15:
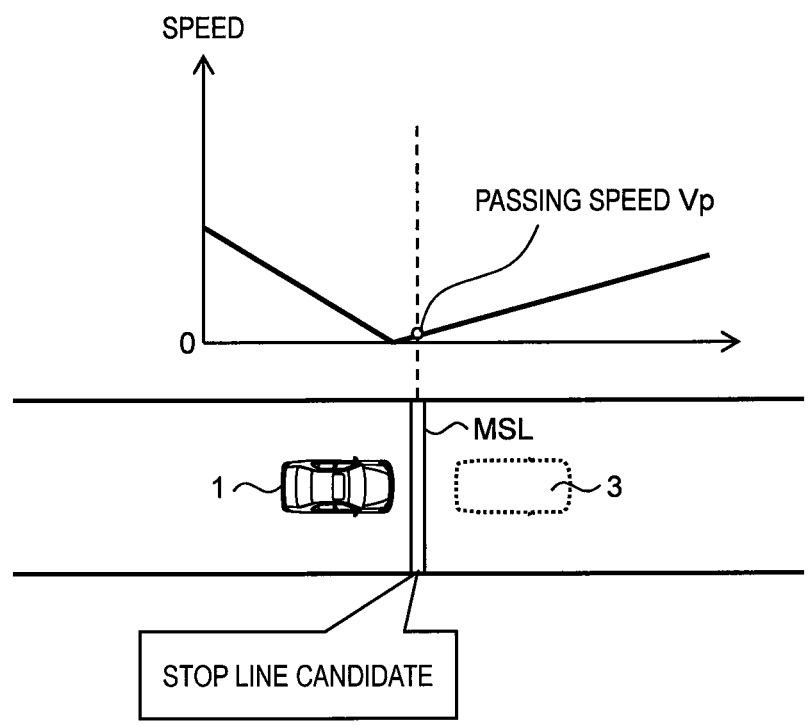
FIG. 15 is a conceptual diagram for explaining a fourth example of the method of determining the evaluation value based on vehicle behavior in the embodiment of the present disclosure.

FIG. 15 is a conceptual diagram for explaining the fourth example. Let us consider a situation when the vehicle 1 stops before the stop line candidate. When a preceding vehicle 3 exists ahead of the vehicle 1, there is a high possibility that the vehicle 1 stops due to the presence of the preceding vehicle 3. On the other hand, when no preceding vehicle 3 exists ahead of the vehicle 1, there is a high possibility that the stop line candidate is the mandatory stop line MSL. It is therefore possible to adjust the mandatory stop line evaluation value Pmsl obtained in the third example according to presence or absence of the preceding vehicle 3.

More specifically, the database management device 30 determines, based on the surrounding situation information 210, whether or not any preceding vehicle 3 exists in a certain area ahead of the vehicle 1. An "increase condition" is that the vehicle 1 stops in the certain area before the stop line candidate despite absence of the preceding vehicle 3. The certain area is an area before the stop line candidate in which a vehicle is generally considered to stop. When the increase condition is satisfied, the database management device 30 adds a correction value to the mandatory stop line evaluation value Pmsl obtained in the third example. That is, the database management device 30 increases the mandatory stop line evaluation value Pmsl.

4-5. Fifth Example

A fifth example also proposes a method for further increasing accuracy of the mandatory stop line evaluation value Pmsl, as in the case of the fourth example. The fifth example is implemented in combination with the third example or the fourth example.

Figure 16:
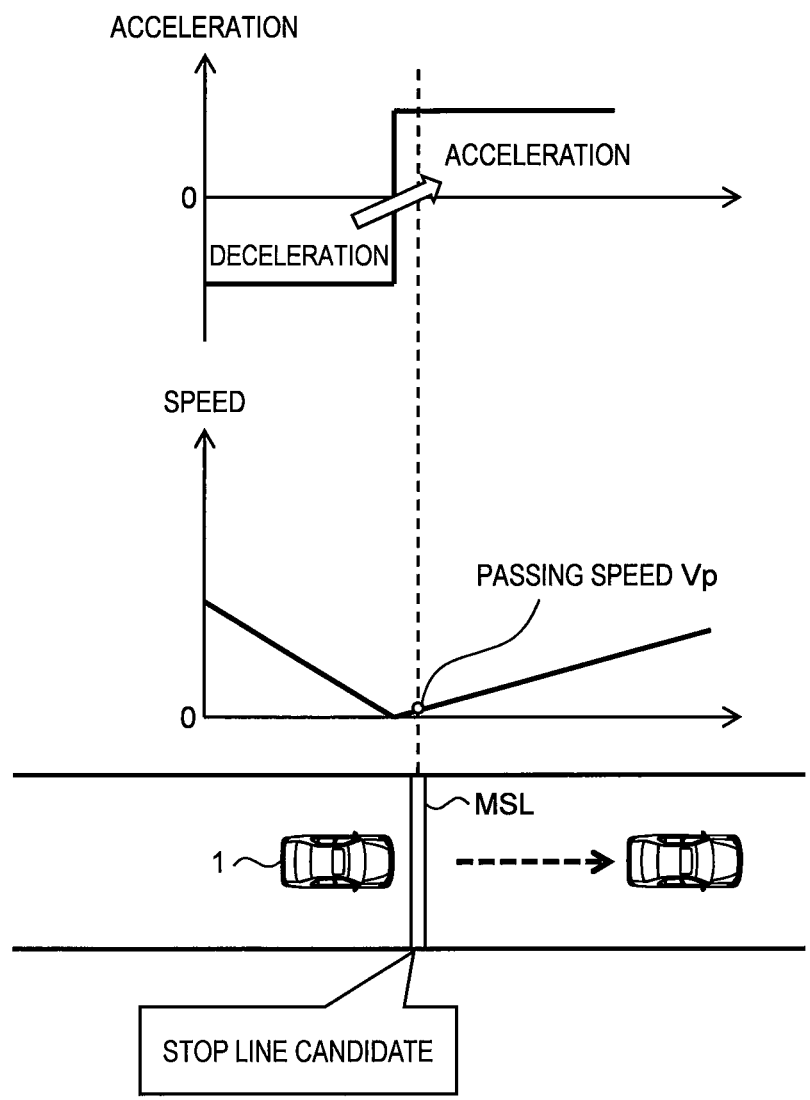
FIG. 16 is a conceptual diagram for explaining a fifth example of the method of determining the evaluation value based on vehicle behavior in the embodiment of the present disclosure.
Figure 17:
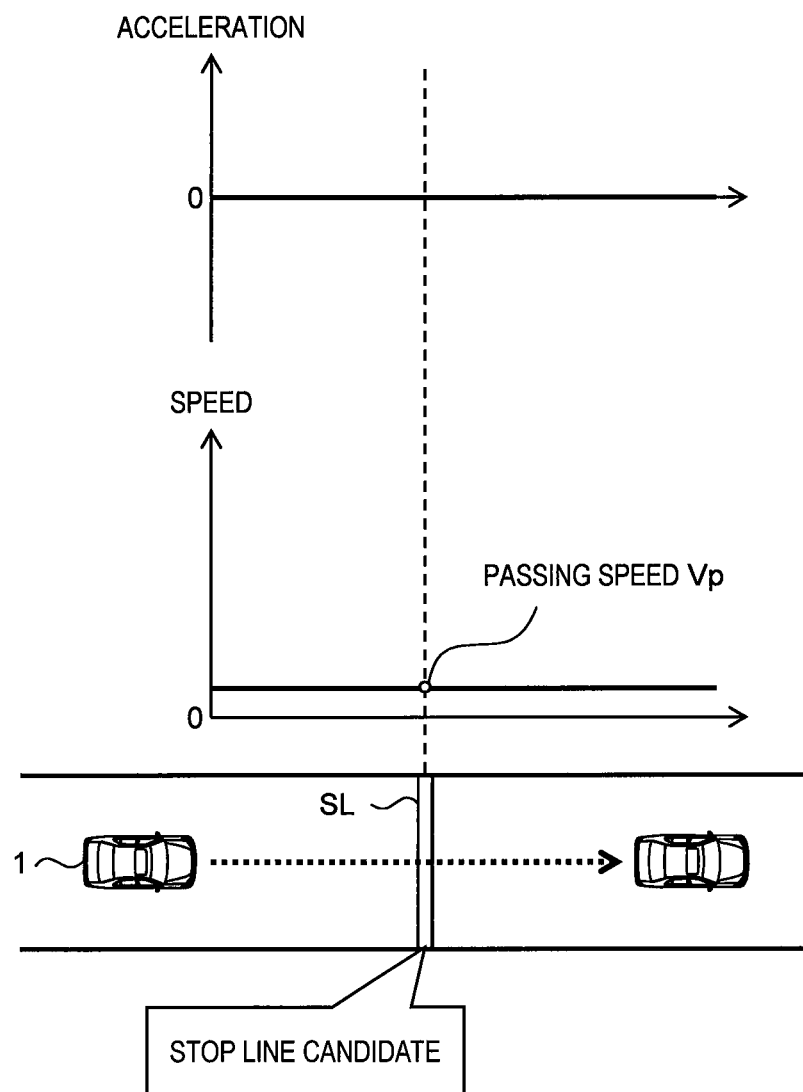
FIG. 17 is a conceptual diagram for explaining the fifth example of the method of determining the evaluation value based on vehicle behavior in the embodiment of the present disclosure.

FIGS. 16 and 17 are conceptual diagrams for explaining the fifth example. FIG. 16 shows a speed and an acceleration when the vehicle 1 passes the mandatory stop line MSL. The vehicle 1 is required to always stop before the mandatory stop line MSL. Therefore, switching from deceleration to acceleration of the vehicle 1 occurs before the mandatory stop line MSL. On the other hand, FIG. 17 shows a speed and an acceleration when the vehicle 1 passes the stop line SL other than the mandatory stop line MSL. The switching from deceleration to acceleration does not necessarily occur before the stop line SL. It is therefore possible to adjust the mandatory stop line evaluation value Pmsl obtained in the third example according to presence or absence of the switching.

More specifically, the database management device 30 determines, based on the vehicle state information 230 (i.e. the acceleration), whether or not the switching from deceleration to acceleration of the vehicle 1 occurs in a certain area before the stop line candidate. An "increase condition" is that the switching occurs. When the increase condition is satisfied, the database management device 30 adds a correction value to the mandatory stop line evaluation value Pmsl obtained in the third example. That is, the database management device 30 increases the mandatory stop line evaluation value Pmsl. On the other hand, a "decrease condition" is that the switching does not occur. When the decrease condition is satisfied, the database management device 30 subtracts a correction value from the mandatory stop line evaluation value Pmsl obtained in the third example. That is, the database management device 30 decreases the mandatory stop line evaluation value Pmsl.

4-6. Sixth Example

A sixth example also proposes a method for further increasing accuracy of the mandatory stop line evaluation value Pmsl, as in the case of the fourth example. The sixth example is implemented in combination with any of the third to fifth examples.

Figure 18:
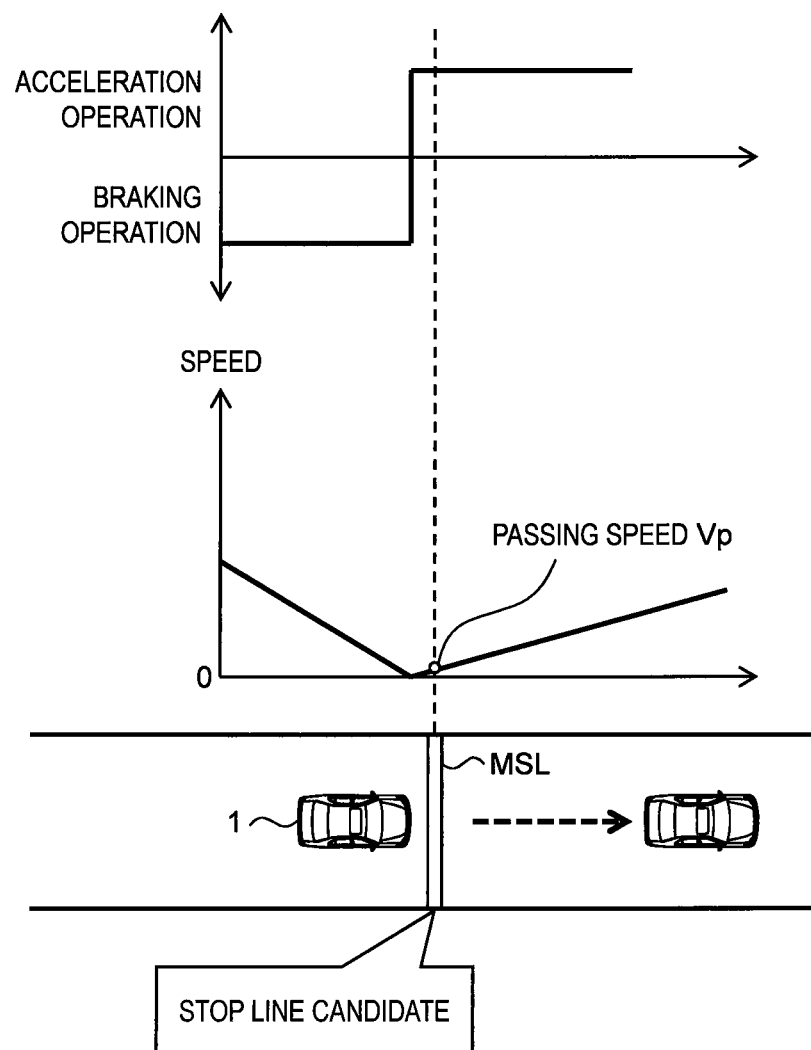
FIG. 18 is a conceptual diagram for explaining a sixth example of the method of determining the evaluation value based on vehicle behavior in the embodiment of the present disclosure.
Figure 19:
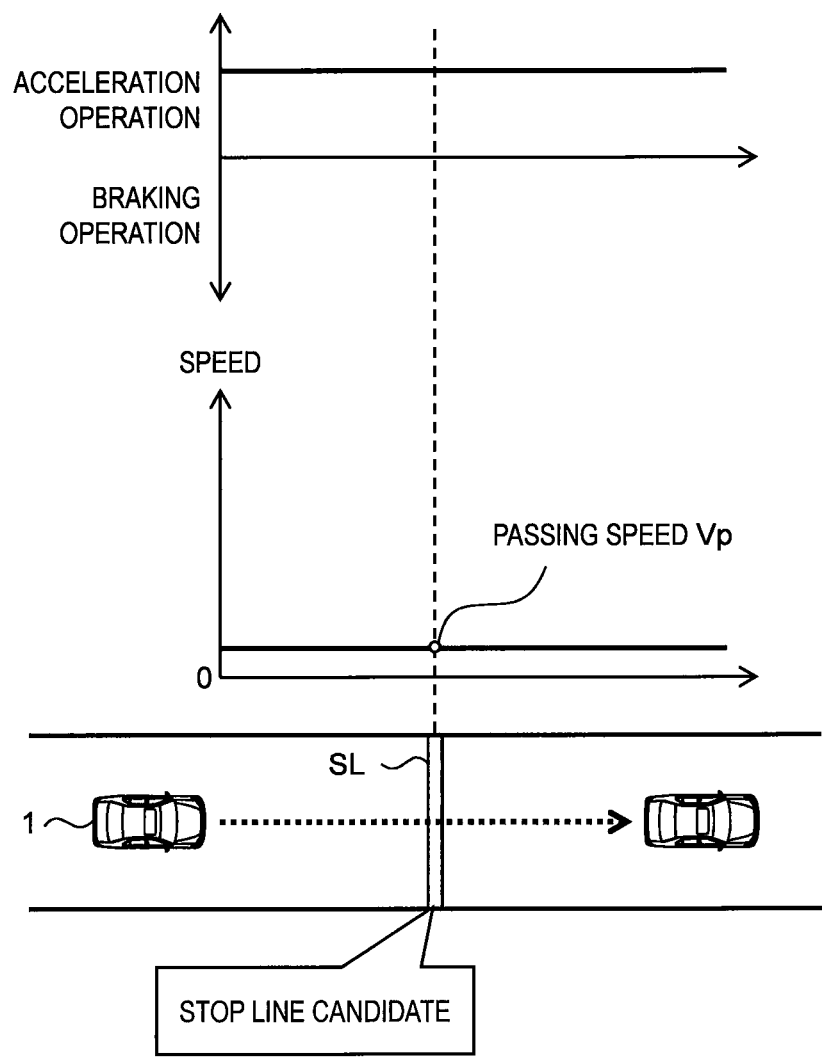
FIG. 19 is a conceptual diagram for explaining the sixth example of the method of determining the evaluation value based on vehicle behavior in the embodiment of the present disclosure.

FIGS. 18 and 19 are conceptual diagrams for explaining the sixth example. FIG. 18 shows as speed and a driving operation when the vehicle 1 passes the mandatory stop line MSL. The vehicle 1 is required to always stop before the mandatory stop line MSL. Therefore, operation switching from a braking operation to an acceleration operation by the driver occurs before the mandatory stop line MSL. On the other hand, FIG. 19 shows a speed and a driving operation when the vehicle 1 passes the stop line SL other than the mandatory stop line MSL. The operation switching from the braking operation to the acceleration operation does not necessarily occur before the stop line SL. It is therefore possible to adjust the mandatory stop line evaluation value Pmsl obtained in the third example according to presence or absence of the operation switching.

More specifically, the database management device 30 determines, based on the vehicle state information 230 (i.e. the driving operation), whether or not the operation switching from the braking operation to the acceleration operation by the driver occurs in a certain area before the stop line candidate. An "increase condition" is that the operation switching occurs. When the increase condition is satisfied, the database management device 30 adds a correction value to the mandatory stop line evaluation value Pmsl obtained in the third example. That is, the database management device 30 increases the mandatory stop line evaluation value Pmsl. On the other hand, a "decrease condition" is that the operation switching does not occur. When the decrease condition is satisfied, the database management device 30 subtracts a correction value from the mandatory stop line evaluation value Pmsl obtained in the third example. That is, the database management device 30 decreases the mandatory stop line evaluation value Pmsl.

It should be noted that in the third to sixth examples described above, vehicle state information regarding another vehicle 2 may be used instead of the vehicle state information 230 regarding the vehicle 1. For example, when the database management device 30 is installed on the vehicle 1 (see FIG. 7), the database management device 30 can acquire the vehicle state information from another vehicle 2 through the V2V communication.

4-7. Seventh Example

Figure 20:
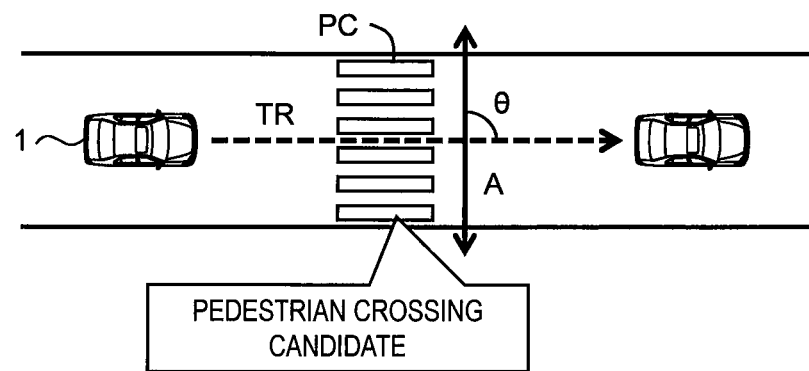
FIG. 20 is a conceptual diagram for explaining a seventh example of the method of determining the evaluation value based on vehicle behavior in the embodiment of the present disclosure.
Figure 21:
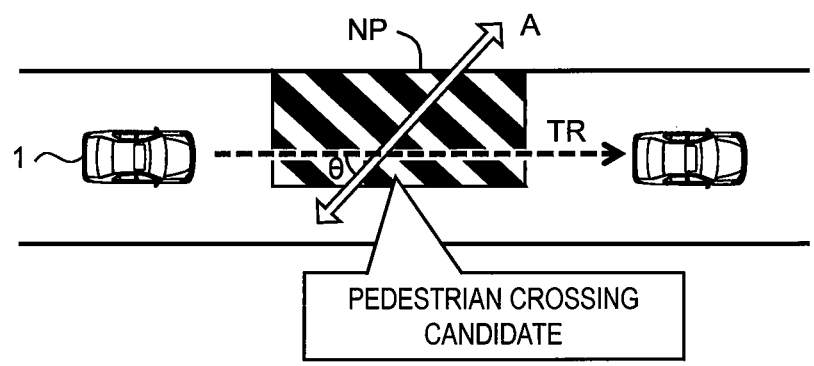
FIG. 21 is a conceptual diagram for explaining the seventh example of the method of determining the evaluation value based on vehicle behavior in the embodiment of the present disclosure.

FIGS. 20 and 21 are conceptual diagrams for explaining a seventh example. In the seventh example, we consider the "pedestrian crossing candidate" being a candidate for the pedestrian crossing PC. The pedestrian crossing evaluation value Ppc indicates certainty of the pedestrian crossing candidate being the pedestrian crossing PC.

FIG. 20 shows a situation where the vehicle 1 passes the pedestrian crossing PC. In general, a trajectory TR of the vehicle 1 passing the pedestrian crossing PC is almost orthogonal to the arrangement direction A of the pedestrian crossing PC. In other words, an angle θ between the trajectory TR of the vehicle 1 and the arrangement direction A of the pedestrian crossing PC is close to 90 degrees. On the other hand, FIG. 21 shows another situation where the vehicle 1 passes a no-parking marking NP. An angle θ between the trajectory TR of the vehicle 1 and an arrangement direction A of the no-parking marking NP is small. Therefore, it is possible to determine the pedestrian crossing evaluation value Ppc based on the angle θ.

More specifically, the database management device 30 recognizes the trajectory TR of the vehicle 1 passing the pedestrian crossing candidate as the vehicle behavior, based on the vehicle position information 220. Then, the database management device 30 calculates an angle θ between the trajectory TR of the vehicle 1 and the arrangement direction A of the pedestrian crossing candidate. The database management device 30 increases the pedestrian crossing evaluation value Ppc as the angle θ is closer to 90 degrees. In other words, the database management device 30 calculates the pedestrian crossing evaluation value Ppc to be higher as the angle θ is closer to 90 degrees.

4-8. Eighth Example

An eighth example is a modification example of the seventh example. In the eighth example, a trajectory TR of another vehicle 2 (see FIG. 4) instead of the vehicle 1 is used. More specifically, the database management device 30 recognizes the trajectory TR of another vehicle 2 passing the pedestrian crossing candidate as the vehicle behavior, based on the surrounding situation information 210. Then, the database management device 30 calculates an angle θ between the trajectory TR of said another vehicle 2 and the arrangement direction A of the pedestrian crossing candidate. The database management device 30 increases the pedestrian crossing evaluation value Ppc as the angle θ is closer to 90 degrees. In other words, the database management device 30 calculates the pedestrian crossing evaluation value Ppc to be higher as the angle θ is closer to 90 degrees.

4-9. Ninth Example

In a ninth example, a result of recognition of the white line in Step S100 is taken into consideration. For example, when the white line detected as the road marking candidate is blurred, the database management device 30 calculates the evaluation value to be low. As another example, when a difference in brightness between the white line detected as the road marking candidate and its surrounding area is small, the database management device 30 calculates the evaluation value to be low.

4-10. Tenth Example

It is also possible to combine some of the first to ninth examples described above, as long as there is no contradiction.

5. Update of Evaluation Value of Road Marking Map Information

Next, update of the evaluation value of the road marking map information RM_MAP will be described. Here, we consider a case where the road marking map information RM_MAP indicates the evaluation value in addition to the position of the specific road marking RM. The specific road marking RM that is already registered in the road marking map information RM_MAP is hereinafter referred to as a "registered road marking".

When the vehicle 1 repeatedly travels a same road, an identical road marking RM is repeatedly detected and information on the identical road marking RM is repeatedly acquired. In other words, the database management device 30 newly acquires information on the registered road marking. Whether or not the road marking candidate is the same as the registered road marking is determined based on the position. For example, an equivalent area that can be regarded as the same position as the registered road marking is set in consideration of a detection error of the surrounding situation sensor 110. It is determined that the road marking candidate included in the equivalent area is the same as the registered road marking.

When newly acquiring information on the road marking candidate corresponding to the registered road marking (i.e. the road marking candidate being the same as the registered road marking), the database management device 30 updates the information on the registered road marking. For example, the database management device 30 updates the evaluation value regarding the registered road marking, based on the vehicle behavior with respect to the road marking candidate corresponding to the registered road marking. For example, an average value or a weighted average of the evaluation values calculated so far is registered in the road marking map information RM_MAP. In the case of the weighted average value, it is preferable that a weight for the latest evaluation value is set to be the largest.

As to the stop line candidate, the mandatory stop line evaluation value Pmsl is determined in addition to the stop line evaluation value Psl, as described in the above Section 4. The mandatory stop line evaluation value Pmsl may be updated to increase or decrease according to the above-described "increase condition" or "decrease condition". For example, an initial value of the mandatory stop line evaluation value Pmsl is set. The database management device 30 determines whether the increase condition or the decrease condition is satisfied. When the increase condition is satisfied, the database management device 30 increases the mandatory stop line evaluation value Pmsl regarding the registered road marking. On the other hand, when the decrease condition is satisfied, the database management device 30 decreases the mandatory stop line evaluation value Pmsl regarding the registered road marking.

Figure 22:
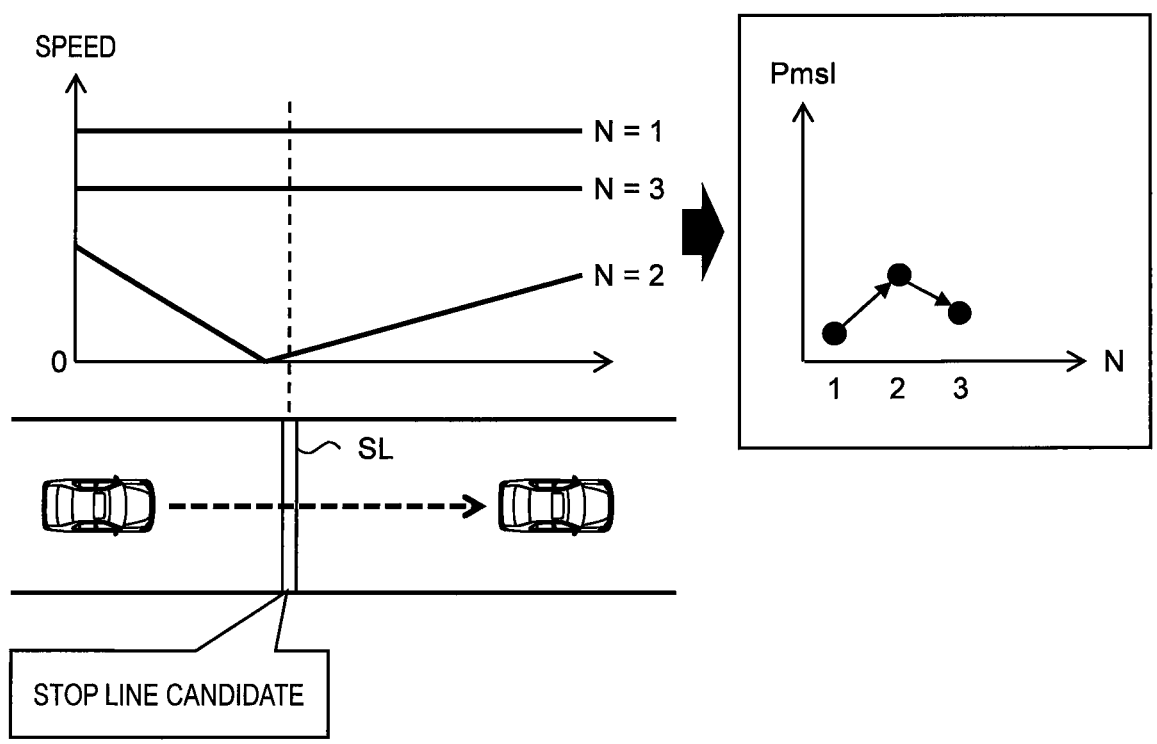
FIG. 22 is a conceptual diagram for explaining an example of update of a mandatory stop line evaluation value in the embodiment of the present disclosure.

FIG. 22 shows an example of the update of the mandatory stop line evaluation value Pmsl. In the example shown in FIG. 22, the stop line candidate is the stop line SL other than the mandatory stop line MSL. N represents the number of times of passing the stop line candidate. At the first passing (N=1), the vehicle 1 does not stop before the stop line candidate. At the second passing (N=2), the vehicle 1 stops before the stop line candidate in order to give way to a pedestrian. As a result, the mandatory stop line evaluation value Pmsl is increased. However, at the third passing (N=3), the vehicle 1 does not stop before the stop line candidate. As a result, the mandatory stop line evaluation value Pmsl is decreased. As seen above, accuracy of the mandatory stop line evaluation value Pmsl is maintained due to the update of the mandatory stop line evaluation value Pmsl.

Figure 23:
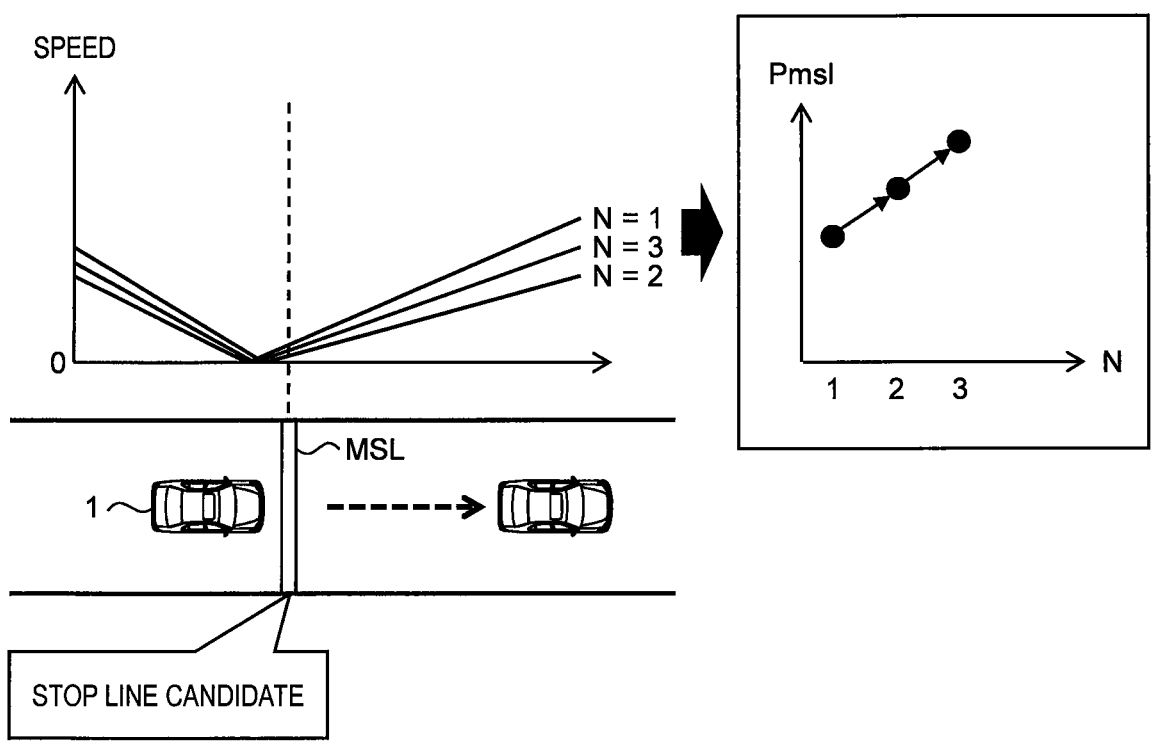
FIG. 23 is a conceptual diagram for explaining another example of update of the mandatory stop line evaluation value in the embodiment of the present disclosure.

FIG. 23 shows another example of the update of the mandatory stop line evaluation value Pmsl. In the example shown in FIG. 23, the stop line candidate is the mandatory stop line MSL. The vehicle 1 stops before the stop line candidate every time. As a result, the mandatory stop line evaluation value Pmsl keeps increasing. As seen above, accuracy of the mandatory stop line evaluation value Pmsl is increased due to the update of the mandatory stop line evaluation value Pmsl.

Figure 24:
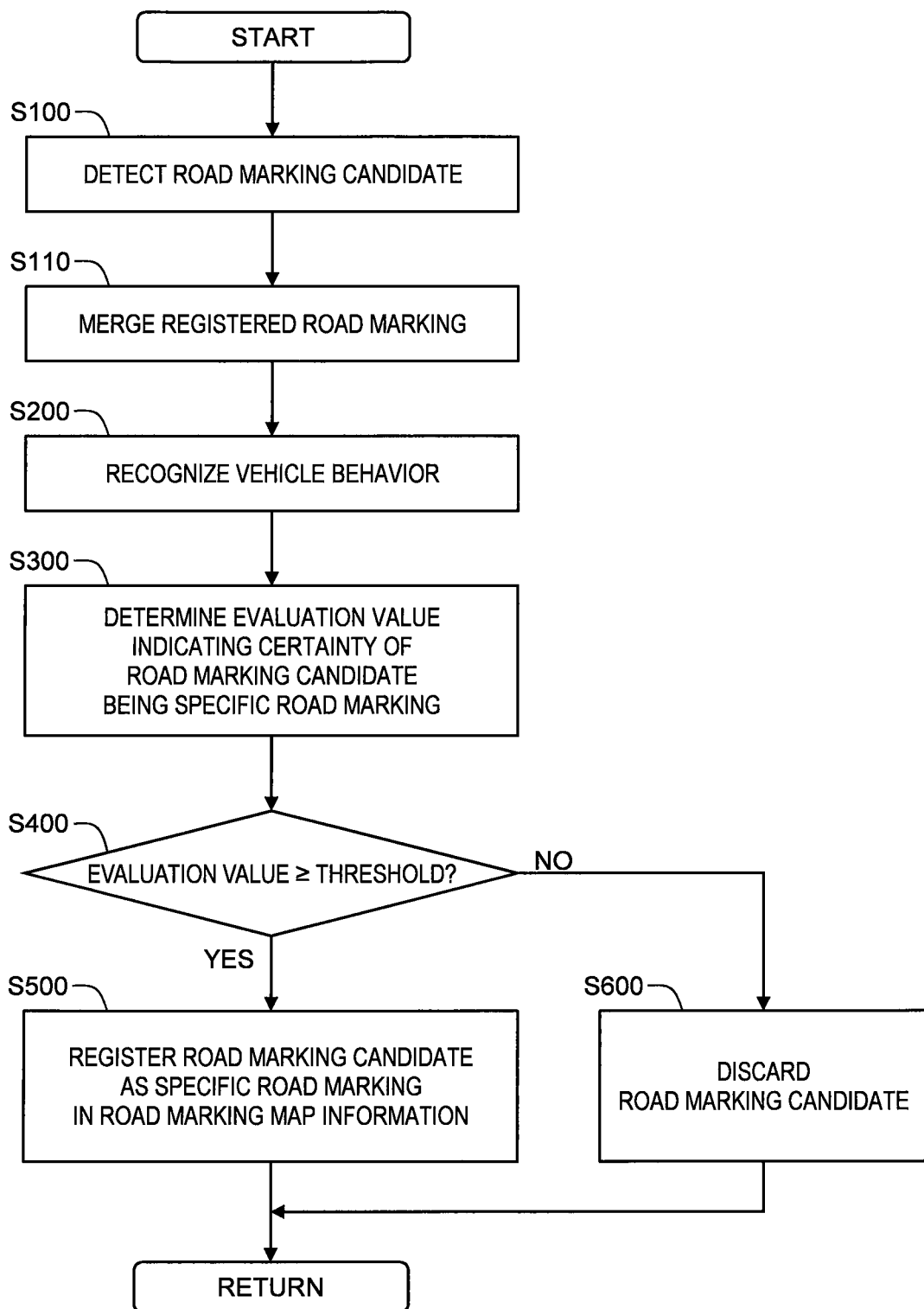
FIG. 24 is a flow chart showing another example of processing by the database management device according to the embodiment of the present disclosure.

FIG. 24 is a flow chart showing an example of the processing by the database management device 30. An overlapping description with the foregoing FIG. 10 will be omitted as appropriate. In the example shown in FIG. 24, Step S110 is added between Step S100 and Step S200.

In Step S110, the database management device 30 reads out the road marking map information RM_MAP and merges the registered road marking with the road marking candidate. That is, the database management device 30 combines the road marking candidate detected in Step S100 and the registered road marking. When the road marking candidate detected in Step S100 is the same as the registered road marking, they are merged into a single road marking candidate. When no road marking candidate identical to the registered road marking is detected in Step S100, the registered road marking may be discarded.

After that, the database management device 30 executes Steps S200 to S600. In Step S500, the database management device 30 updates the road marking map information RM_MAP.

The update processing described above causes further increase in the accuracy (quality) of the road marking map information RM_MAP. As a result, the accuracy of the driving support control using the road marking map information RM_MAP also is further increased.

6. Other Processing

In Step S100 described above, the database management device 30 detects the road marking candidate. Here, the following problem is considered. For example, when a stop line is blurred, the stop line may not be correctly detected as the stop line candidate. As another example, when a character road marking "STOP" is present in the vicinity of the stop line (mandatory stop line), not only the stop line but also a transverse line included in "STOP" may be detected as the stop line candidate. In this case, a plurality of stop line information may be registered in the road marking map information RM_MAP, although only a single stop line exists in reality. Hereinafter, a method for dealing with such excess or deficiency of the stop line candidate will be described.

In the present example, the database management device 30 acquires navigation map information. The navigation map information indicates presence or absence of intersections, stop lines, and pedestrian crossings, and their rough positions. That is to say, the navigation map information indicates the position of the specific road marking RM with lower accuracy than the road marking map information RM_MAP. Such the navigation map information is included in the map database MAP_DB. The database management device 30 acquires the navigation map information from the map database MAP_DB.

Figure 25:
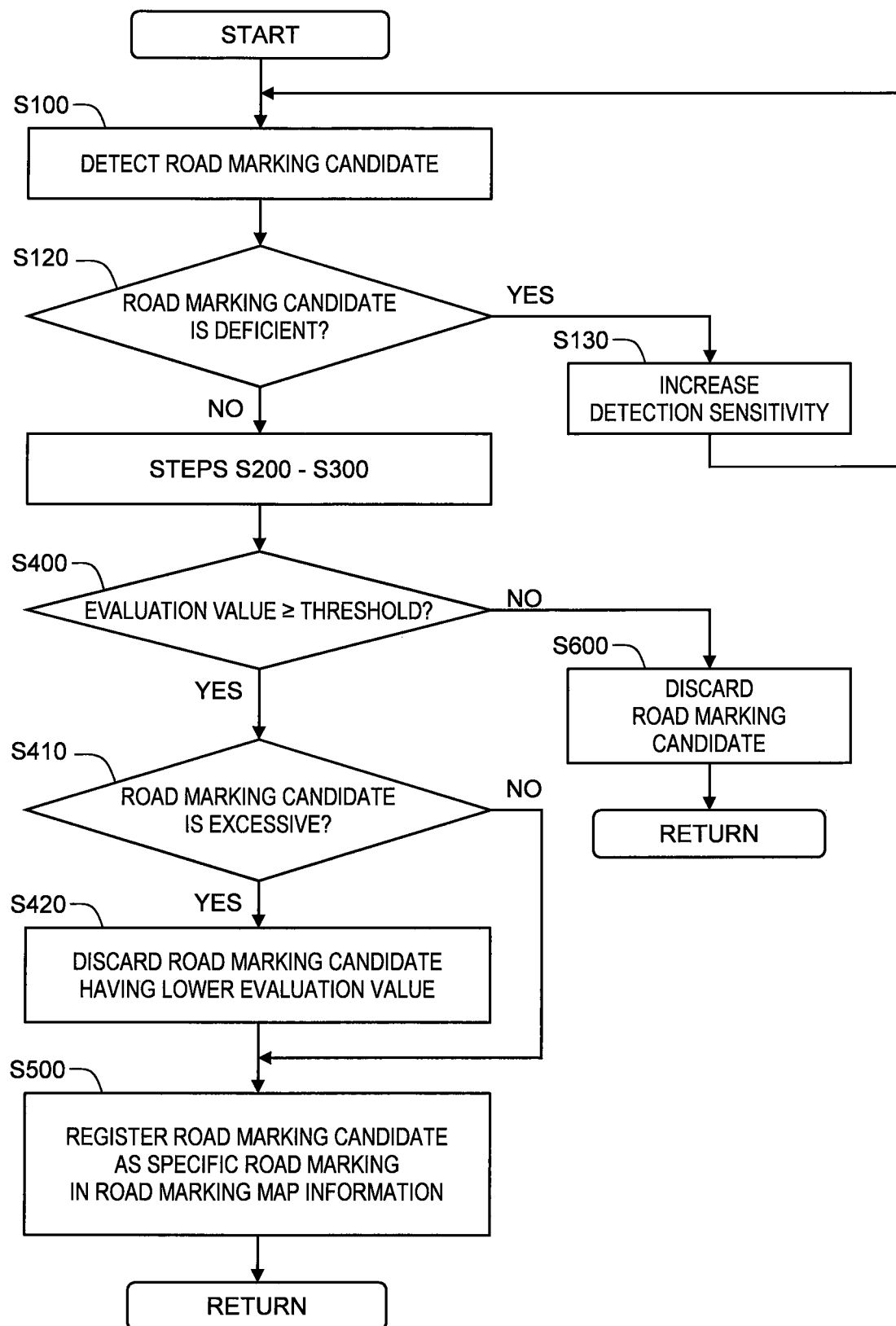
FIG. 25 is a flow chart showing still another example of processing by the database management device according to the embodiment of the present disclosure.

FIG. 25 is a flow chart showing an example of processing by the database management device 30. An overlapping description with the foregoing FIG. 10 will be omitted as appropriate.

After Step S100, the database management device 30 compares a result of detection of the road marking candidate in Step S100 with the navigation map information (Step S120). When the specific road marking RM indicated by the navigation map information is not detected as the road marking candidate, it means that the road marking candidate is deficient. When the road marking candidate is deficient (Step S120; Yes), the processing proceeds to Step S130. Otherwise (Step S120; No), the processing proceeds to Step S200.

In Step S130, the database management device 30 increases sensitivity of the detection processing for detecting the road marking candidate. For example, the database management device 30 lowers an extraction threshold used for extracting the white line from the road surface image. After that, the processing returns back to Step S100. The database management device 30 executes the detection processing again with respect to an area where the road marking candidate is deficient.

Moreover, after Step S400, the database management device 30 compares the result of detection of the road marking candidate in Step S100 with the navigation map information (Step S410). When a plurality of road marking candidates are detected in the vicinity of the specific road marking RM indicated by the navigation map information, it means that the road marking candidate is excessive. When the road marking candidate is excessive (Step S410; Yes), the processing proceeds to Step S420. Otherwise (Step S410; No), the processing proceeds to Step S500.

In Step S420, the database management device 30 compares respective evaluation values of the plurality of road marking candidates. Then, the database management device 30 discards the road marking candidate having lower evaluation value and selects the road marking candidate having the highest evaluation value. After that, the processing proceeds to Step S500. The database management device 30 registers the road marking candidate having the highest evaluation value, as the specific road marking RM, in the road marking map information RM_MAP.

The processing of Steps S410 and S420 may be executed after the merge processing (Step S110) described in the above FIG. 24 is executed. In that case, it is expected that the road marking candidate erroneously registered in the road marking map information RM_MAP is discarded.

What is claimed is:

1. A map information system comprising:
one or more processors configured to manage a map database used for driving support control that supports driving of a vehicle, wherein
the map database includes road marking map information that indicates a position of a specific road marking including at least one of a stop line and a pedestrian crossing,
driving environment information indicates driving environment for the vehicle that is acquired by a sensor installed on the vehicle,
the one or more processors are further configured to:
  detect a road marking candidate being a candidate for the specific road marking around the vehicle, based on the driving environment information;
  recognize vehicle behavior of at least one of the vehicle and another vehicle in a period when passing the road marking candidate, based on the driving environment information;
  determine, based on the vehicle behavior, an evaluation value that indicates certainty of the road marking candidate being the specific road marking; and
  register the road marking candidate having the evaluation value equal to or higher than a threshold, as the specific road marking, in the road marking map information,
the specific road marking includes the stop line,
the road marking candidate includes a stop line candidate which is a candidate for the stop line,
a stop line evaluation value is an evaluation value that indicates certainty of the stop line candidate being the stop line,
and
the one or more processors are further configured to:

recognize a trajectory of the vehicle or the other vehicle passing the stop line candidate as the vehicle behavior, based on the driving environment information; and increase the stop line evaluation value as an angle between a longitudinal direction of the stop line candidate and the trajectory of the vehicle or the other vehicle is closer to 90 degrees.

2. The map information system according to claim 1, wherein
the stop line includes a mandatory stop line,
a mandatory stop line evaluation value is an evaluation value that indicates certainty of the stop line candidate being the mandatory stop line,
the driving environment information includes vehicle state information indicating a speed of the vehicle, and
the one or more processors are further configured to:
recognize the speed on the stop line candidate as the vehicle behavior, based on the vehicle state information; and
increase the mandatory stop line evaluation value as the speed on the stop line candidate is lower.

3. The map information system according to claim 1, wherein
the stop line includes a mandatory stop line,
a mandatory stop line evaluation value is an evaluation value that indicates certainty of the stop line candidate being the mandatory stop line,
the driving environment information includes vehicle state information indicating a speed of the vehicle, and
the one or more processors are further configured to:
recognize the speed on the stop line candidate as the vehicle behavior, based on the vehicle state information;
increase the mandatory stop line evaluation value, when the speed on the stop line candidate is lower than a speed threshold; and
decrease the mandatory stop line evaluation value, when the speed on the stop line candidate is equal to or higher than the speed threshold.

4. The map information system according to claim 2, wherein
the driving environment information includes surrounding situation information indicating a situation around the vehicle, and
the one or more processors are further configured to:
determine, based on the surrounding situation information, whether a preceding vehicle exists ahead of the vehicle; and
increase the mandatory stop line evaluation value, when the vehicle stops in a certain area before the stop line candidate despite absence of the preceding vehicle.

5. The map information system according to claim 2, wherein
the one or more processors are further configured to:
determine, based on the vehicle state information, whether switching from deceleration to acceleration of the vehicle occurs in a certain area before the stop line candidate;
increase the mandatory stop line evaluation value, when the switching occurs in the certain area before the stop line candidate; and decrease the mandatory stop line evaluation value, when the switching does not occur in the certain area before the stop line candidate.

6. The map information system according to claim 2, wherein
the vehicle state information further indicates a driving operation by a driver of the vehicle, and
the one or more processors are further configured to:
determine, based on the vehicle state information, whether operation switching from a braking operation to an acceleration operation by the driver occurs in a certain area before the stop line candidate;
increase the mandatory stop line evaluation value, when the operation switching occurs in the certain area before the stop line candidate; and
decrease the mandatory stop line evaluation value, when the operation switching does not occur in the certain area before the stop line candidate.

7. A map information system comprising:
one or more processors configured to manage a map database used for driving support control that supports driving of a vehicle, wherein
the map database includes road marking map information that indicates a position of a specific road marking including at least one of a stop line and a pedestrian crossing,
driving environment information indicates driving environment for the vehicle that is acquired by a sensor installed on the vehicle,
the one or more processors are further configured to:
detect a road marking candidate being a candidate for the specific road marking around the vehicle, based on the driving environment information;
recognize vehicle behavior of at least one of the vehicle and another vehicle in a period when passing the road marking candidate, based on the driving environment information;
determine, based on the vehicle behavior, an evaluation value that indicates certainty of the road marking candidate being the specific road marking; and
register the road marking candidate having the evaluation value equal to or higher than a threshold, as the specific road marking, in the road marking map information,
the specific road marking includes the pedestrian crossing,
the pedestrian crossing has a stripe pattern that a plurality of lines orthogonal to a first direction are arranged in parallel,
the road marking candidate includes a pedestrian crossing candidate which is a candidate for the pedestrian crossing,
a pedestrian crossing evaluation value is an evaluation value that indicates certainty of the pedestrian crossing candidate being the pedestrian crossing,
and
the one or more processors are further configured to:
recognize a trajectory of the vehicle or the other vehicle passing the pedestrian crossing candidate as the vehicle behavior, based on the driving environment information; and
increase the pedestrian crossing evaluation value as an angle between the first direction of the pedestrian crossing candidate and the trajectory of the vehicle is closer to 90 degrees.

* * * * *